(12) United States Patent  
Yannette et al.

(10) Patent No.: US 9,154,132 B2  
(45) Date of Patent: Oct. 6, 2015

(54) CHARGE DISTRIBUTION CONTROL FOR SECURE SYSTEMS

(71) Applicant: CHAOLOGIX, INC., Gainesville, FL (US)

(72) Inventors: Daniel F. Yannette, Satellite Beach, FL (US); Brent Arnold Myers, Palm Bay, FL (US)

(73) Assignee: CHAOLOGIX, INC., Gainesville, FL (US)

( * ) Notice: Subject to any disclaimer, the term of this patent is extended or adjusted under 35 U.S.C. 154(b) by 0 days.

(21) Appl. No.: 14/535,983

(22) Filed: Nov. 7, 2014

(65) Prior Publication Data

US 2015/0130505 A1     May 14, 2015

Related U.S. Application Data

(63) Continuation of application No. 14/184,088, filed on Feb. 19, 2014, now Pat. No. 8,912,816, which is a continuation-in-part of application No. 13/906,542, filed on May 31, 2013, now Pat. No. 8,912,814.

(60) Provisional application No. 61/725,128, filed on Nov. 12, 2012.

(51) Int. Cl.
*H03K 19/00* (2006.01)
*H03K 19/003* (2006.01)
*H03K 19/0948* (2006.01)

(52) U.S. Cl.
CPC ...... *H03K 19/00315* (2013.01); *H03K 19/0948* (2013.01)

(58) Field of Classification Search
CPC ... G01R 31/31719; G06F 21/76; G06F 21/78; H03K 19/17768

USPC .......................... 326/8, 93, 112–113; 323/288
See application file for complete search history.

(56) References Cited

U.S. PATENT DOCUMENTS 5,491,468 A    2/1996  Everett et al.
5,998,978 A *  12/1999 Connell et al. ............... 323/273

(Continued)

FOREIGN PATENT DOCUMENTS

EP    1107191 A1    6/2001
EP    2693680 A1    2/2014

(Continued)

OTHER PUBLICATIONS

Tokunaga, et al. "Secure AES Engine with a Local Switched-Capacitor Current Equalizer," 2009 IEEE International Solid-State Circuits Conference, Session 3, Microprocessor Technologies.

(Continued)

*Primary Examiner* — Jason M Crawford
(74) *Attorney, Agent, or Firm* — Talem IP Law, LLP

(57) ABSTRACT

Advantageous analog and/or digital logic cells and methods of powering circuit blocks using the same are provided. A digital logic cell can include a charge storage device, a logic block, and connections to a power supply. The charge storage device may be a capacitor. The capacitor or other charge storage device can be disconnected from the logic block and a power supply to discharge the capacitor, and then connected to the power supply, via the power supply connections, to charge the capacitor. The capacitor can be disconnected from a ground connection of the power supply while the capacitor is discharged. After being charged via the power supply, the capacitor can also be disconnected from the power supply (including ground) and connected to the logic block to power the logic block.

12 Claims, 19 Drawing Sheets

(56) References Cited

U.S. PATENT DOCUMENTS

| | | |
|---|---|---|
| 6,320,770 B1 | 11/2001 | Feuser |
| 6,594,760 B1 | 7/2003 | Ryan, Jr. et al. |
| 6,748,410 B1 | 6/2004 | Gressel et al. |
| 6,748,535 B1 | 6/2004 | Ryan, Jr. et al. |
| 7,656,143 B2* | 2/2010 | Nagaya et al. ............ 323/288 |
| 7,880,339 B2 | 2/2011 | Tokunaga et al. |
| 8,525,545 B1* | 9/2013 | May et al. ................. 326/8 |
| 8,638,074 B2* | 1/2014 | Babcock et al. ........... 323/225 |
| 8,912,814 B2* | 12/2014 | Yannette et al. ........... 326/8 |
| 8,912,816 B2* | 12/2014 | Yannette et al. ........... 326/8 |
| 2003/0198082 A1 | 10/2003 | Silverbrook et al. |
| 2007/0085563 A1* | 4/2007 | Ciccarelli et al. ......... 326/41 |
| 2007/0146958 A1* | 6/2007 | Babcock et al. ........... 361/160 |
| 2010/0060246 A1* | 3/2010 | Babcock et al. ........... 323/225 |
| 2010/0064371 A1 | 3/2010 | Mostovych |
| 2010/0275063 A1 | 10/2010 | Walmsley et al. |
| 2011/0115462 A1* | 5/2011 | Babcock et al. ........... 323/351 |
| 2012/0131679 A1 | 5/2012 | Lu et al. |
| 2012/0139577 A1 | 6/2012 | Lee |

FOREIGN PATENT DOCUMENTS

| | | |
|---|---|---|
| GB | 2467406 A | 8/2010 |
| WO | 2012133966 A1 | 10/2012 |

OTHER PUBLICATIONS

"International Search Report & Written Opinion for PCT Application No. PCT/US2014/017369", Mailed date: May 13, 2014, 13 pages.

* cited by examiner

FIG. 2A  FIG. 2B

Time = T1

Time = T2

CHARGE DISTRIBUTION CONTROL FOR SECURE SYSTEMS

CROSS-REFERENCE TO RELATED APPLICATIONS

The present application is a continuation of U.S. application Ser. No. 14/184,088, filed Feb. 19, 2014, which is a continuation-in-part of U.S. application Ser. No. 13/906,542, filed May 31, 2013, which claims the benefit of U.S. Provisional Application Ser. No. 61/725,128, filed Nov. 12, 2012, which are hereby incorporated by reference in their entirety, including any figures, tables, or drawings.

BACKGROUND

There are many secure applications in which it can be important to protect electronically stored and/or processed data. Secure applications are implemented today in many areas, including ATM cards, identification cards, stored value cards, credit cards, cellular telephones (e.g., SIM cards), computer access control, pay TV, and storage of medical information. Security for these cards and applications often rely on cryptographic computations based on secret keys embedded in the memories of the cards (or other circuitry). Attackers attempt to extract these keys from the card in order to modify the card's contents, create a duplicate card, or generate an unauthorized transaction. Active attacks leave clearly visible signs of tampering while passive attacks often do not.

In a passive attack, information is collected from the card during its normal interaction with a reader. A passive attack may be in the form of a side channel attack. A side channel attack includes deciphering the keys based on the physical implementation of the use of the card or circuitry by focusing on timing information, power consumption, electromagnetic fields, and even sound. For example, current changes (and resulting power signatures) during switching of the logic gates that form a smart card may be monitored via the power supply lines and used to decode the secret keys. This type of attack, also referred to as differential power analysis (DPA), has many negative implications for the owner of the smart card (e.g., an ATM card can be hacked and used to withdraw cash, unauthorized by the card owner, from the card owner's account). Keeping data secure and protected from side channel attacks, including DPA attacks, continues to be an important design consideration.

BRIEF SUMMARY

Secure circuits, systems and techniques are disclosed. Logic cells can be secured for a variety of applications including for providing encryption blocks from which encryption algorithms are run.

A charge distribution control is described that can isolate circuit operations in a manner that inhibits signals and functions being carried out by a circuit or logic block from being detected through power and ground lines. In some implementations, the charge distribution control can be a clocked charging mechanism. The clocking for the clocked charging mechanism can be periodic or random (or contain periods of randomness). In some other implementations, the charge distribution control can include a self-timing circuit, for example, an asynchronous, delay-based network may be used.

According to an embodiment, a clocked charging mechanism is provided that isolates a logic cell from a power supply and provides charge to the logic cell that does not present current leakage in a manner that could enable the states of the logic cell from being deciphered. The clocked charging mechanism for the logic cell inhibits a readout of a power signature for the logic cell by isolating both the high and low supply rail of the logic cell from external pads including a power supply voltage and ground connection.

Embodiments of the invention provide capacitive charging for operating a logic cell (and other circuit blocks). The capacitive charging is established in a manner sufficient for operating the devices of the logic block through at least one logic transition or switching cycle. Charge control mechanisms can involve one or more clocks and/or self-timing circuits. In one particular clocked implementation, at least two clocks are provided, one clock for operating at a speed for performing the logic of the cell and another clock for charging and discharging a charge storage device between logic operations. In an example non-clocked implementation, a self-timing circuit can be used to control the charging and discharging of a charge storage device.

A digital logic cell of embodiments of the invention can include a capacitor that is controllably charged and discharged in order to provide an "isolation" or "decoupling" between a logic block of the digital logic cell and a power supply to the digital logic cell.

Although digital logic cells and circuits isolated under charge distribution control are described in detail herein, embodiments are not limited to digital logic cells and blocks. Various implementations can include analog circuits that can operate while isolated from a power supply voltage and ground connection.

A method of controlling the charging and discharging of the capacitor can be carried out through switching operations that include the steps of connecting two terminals of the capacitor to each other while the capacitor is disconnected from the logic block and the power supply in order to short the capacitor and allow the capacitor to discharge; connecting the capacitor to the power supply, after the capacitor has been discharged, to charge the capacitor; disconnecting the capacitor from the power supply after the capacitor has been charged by the power supply; and connecting the capacitor to the logic block, after the capacitor has been charged by the power supply, to power the logic block. In some implementations an additional component may be included within the logic block, between the isolated rails of the logic block, to support operation while the capacitor is not connected to the logic block (or in case the capacitor does not carry sufficient charge).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A-2C show example discharge switches of certain embodiments of the invention for a metal oxide semiconductor field effect transistor (MOSFET) implementation.

DETAILED DISCLOSURE

Figure 1:
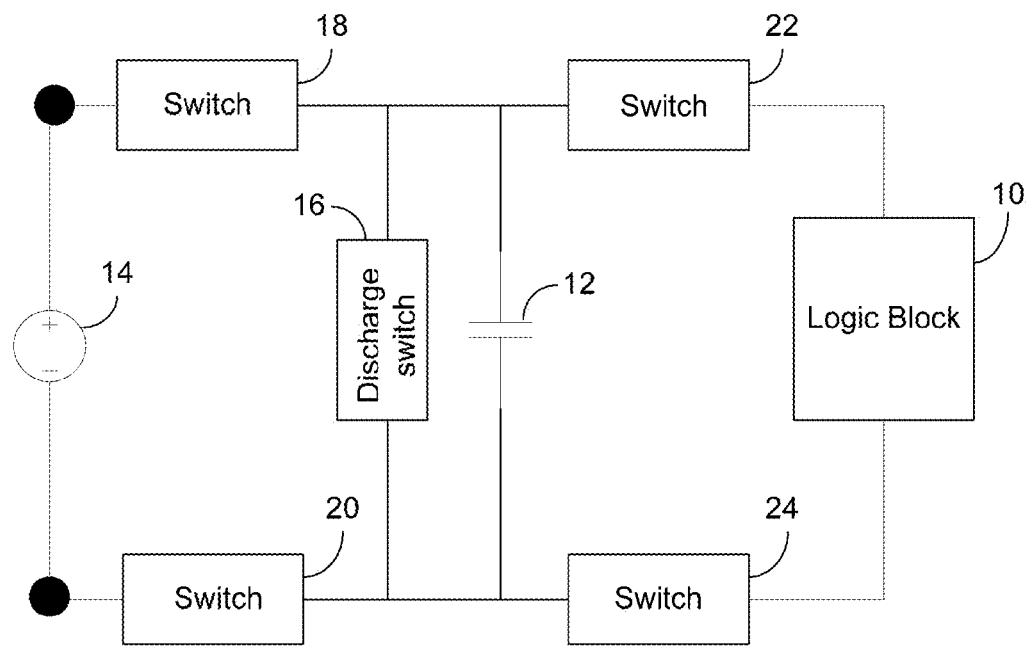
FIG. 1 is a schematic diagram of a clocked charge domain logic (CCDL) cell according to an embodiment of the invention.

Secure circuits, systems and techniques are disclosed. Charge distribution control is used to enable isolated functioning of on-chip circuitry. In some implementations, the charge distribution control can be a clocked charging mechanism. The clocking for the clocked charging mechanism can be periodic or random (or contain periods of randomness). In some other implementations, the charge distribution control can include a self-timing circuit, for example, an asynchronous, delay-based network may be used.

Logic cells and other circuit blocks can be secured for a variety of applications including cryptographic applications involving "crypto" or "cryptographic" blocks such as encryption blocks, authentication engines, hardware math accelerators, and coprocessors. In addition to improving security of circuit operations, various implementations of the charge distribution and control as described herein can reduce current components containing secure information, reduce or obscure circuit operational related information derivable from device current leakage, improve side channel immunity, and minimize power consumption.

Certain implementations may also be used to protect secure information from being detected through side channel analysis attacks. Side channel attacks involve methods of attack that derive sensitive information based on the physical implementation of the crypto system as opposed to deriving the sensitive information through mathematical analysis of the crypto algorithms or brute force. Various types of side channel attacks that may be inhibited by the systems and methods described herein include, but are not limited to, at least one of differential power analysis, simple power analysis, leakage current analysis, differential electromagnetic field analysis, timing analysis, heat, acoustic analysis, fault injection and differential fault analysis.

Certain implementations of the described charge distribution control and secure logic/circuit blocks are capable of protecting against such side channel attacks through isolating logic/circuit blocks from other components (via charge distribution control) and thus inhibiting acoustic, electromagnetic, heat and/or power consumption analysis, fault injection, or even physical intrusion (as just some examples).

Embodiments of the invention provide capacitive charging for operating a logic cell. The capacitive charging is established in a manner sufficient for operating the devices of the logic block through, in some cases, at least one logic transition or switching cycle. Charge control mechanisms can include one or more clocks and/or self-timing circuits. In one clocked implementation, at least two clocks are provided, one clock for operating at a speed for performing the logic of the cell and another clock for charging and discharging a charge storage device between logic operations. In a non-clocked implementation, a self-timing circuit can be used to control the charging and discharging of a charge storage device.

According to an embodiment, a charge control mechanism is provided that isolates a logic cell from a power supply and provides charge to the logic cell that does not present current leakage in a manner that could enable the states of the logic cell from being deciphered. The charge control mechanism for the logic cell inhibits a readout of a power signature for the logic cell by isolating both the high and low supply rail of the logic cell from external pads including a power supply voltage and ground connection.

Crypto-blocks in hardware such as smart cards, near field communication (NFC) controllers (and other wireless communication controllers and processors), field programmable gate arrays (FPGAs), and application specific integrated circuits (ASICs) are generally composed of logic blocks that carry out an encryption or other cryptographic algorithm.

Within cryptographic blocks implemented with standard static logic circuits, the transition of logic states within these circuits create currents that can be detectable upon the power supply (and ground) lines powering the cryptographic block. In addition, the transition of a logic block from a low to a high logic state has a different power signature than a high to low transition. As a result, by monitoring the supply lines powering the cryptographic block, operations within the cryptographic block can be decoded. This approach is referred to as differential power analysis (DPA). Similarly, electromagnetic leaks during logic transitions may be monitored to decode operations within the cryptographic block. Using such side channel attacks, encryption keys used by an encrypted block can be deciphered, resulting in a breach in security of data processed by the encryption block.

Embodiments of the invention can provide minimal area overhead while protecting logic blocks from revealing logic state transitions. Furthermore, not only do embodiments isolate operations of the logic cell so that power consumption is inhibited from being sensed from a supply line during operations of the logic cell, but systems and methods of the invention also protect from charge being read from ground lines. I/O busses and other signal lines can also be protected from side channel attack probes by inhibiting decipherable transition signatures on the signal lines.

In an embodiment, a charge storage device is used to provide an operating voltage to a logic cell and is configured as an intermediate between a power supply and a logic block. In certain embodiments, each logic cell block can include its own charge storage device for independent supplying and discharging of voltage. In one embodiment, the charge storage device is a capacitor; however, embodiments are not limited thereto. Therefore, where a "capacitor" is described or illustrated, it can be understood that any suitable charge storage device may be in the capacitor's place. In addition, it should be understood that a capacitor may be implemented in a variety of ways including, but not limited to metal-oxide-semiconductor, metal-oxide-metal, metal-insulator-metal, and other on-chip capacitor configurations. Furthermore, while "charge storage device" and "capacitor" are referred to in the singular for each cell block, multiple devices or components may be used to provide power to a cell block in some implementations.

Because the charge left after each set of logic operations on a charge storage device, such as a capacitor, contains information about the integrated power consumed by the logic block during each set of logic operations, systems that only disconnect a logic block (or, when used, a charging capacitor) at a power supply can be vulnerable to passive attacks (e.g., DPA) through the ground lines. Embodiments of the invention protect against such a vulnerability by decoupling both the logic block and the charging capacitor from the ground line port.

In accordance with various embodiments of the invention, following each logic transition for a logic block (or following a predetermined number of logic transitions, other period of time, or in a random manner), the charge storage device is discharged to a potential by having its terminals shorted together.

In an embodiment, one or more digital logic cells can be provided. Each digital logic cell can include a charge storage device, connections for a power supply, and a logic block. Each logic block can be configured to be connected to the same power supply. Charge distribution control of the one or more digital logic cells can be carried out to isolate operations of the digital logic cells from the power supply. Advantageously, with charge storage devices distributed throughout an IC chip, charge provided by the charge storage devices can be sufficient without customization of the charge distribution control and capacitance.

A digital logic cell can be configured such that its charge storage device can be disconnected from the power supply and the logic block to discharge the charge storage device. The charge storage device can be disconnected from both rail lines (e.g., power and ground). The charge storage device can then be connected to the power supply while still disconnected from the logic block to charge the charge storage device. Then, the charge storage device can be disconnected from the power supply and connected to the logic block to function as a power source for the logic block. Next, the input to the logic block can be allowed to transition and the charge needed to power the transition(s) can be provided by the charge storage device. This process can start at any point and/or can continue on in a cycle.

Whenever the charge storage device is disconnected from the power supply, the charge storage device can be disconnected from the ground connection of the power supply. The charge storage device can be connected to and disconnected from the power supply using any suitable means known in the art, including one or more switches. Also, the charge storage device can be connected to and disconnected from the logic block using any suitable means known in the art, including one or more switches.

In certain embodiments, transistors can be used as switches to connect the charge storage device to and disconnect the charge storage device from the power supply and/or the logic block. Any suitable transistor known in the art can be used, e.g., a bipolar junction transistor, a metal oxide semiconductor field effect transistor (MOSFET), or a combination thereof. Each MOSFET used can either be a p-type MOSFET (PMOS) or an n-type MOSFET (NMOS). In an embodiment, a transmission-gate configuration can be used. In another embodiment, diodes may be used as one or more of the switches. In yet another embodiment, micro-electro-mechanical systems (MEMS)-based switches may be used.

In certain embodiments, a MOSFET transistor can be used as the charge storage device. In an embodiment in which the charge storage device is the MOSFET capacitor, when disconnecting the capacitor from the power supply and the logic block to discharge the capacitor, the gate of the MOSFET can be connected to the source, drain, and/or body terminals of the MOSFET to allow the capacitor to fully discharge. The gate of the MOSFET capacitor can be connected to the source, drain, and (in some cases) body terminals of the MOSFET using any suitable means in the art, including one or more switches which can be transistors as described herein. Then, when the capacitor is connected to the power supply while still disconnected from the logic block to charge the capacitor, the gate of the capacitor can be disconnected from the source, drain, and body terminals of the MOSFET used as the capacitor.

In another embodiment, the charge storage device may be a discrete capacitor. In yet another embodiment, the charge storage device can be a charge coupled device or other active charge storage device.

Each logic block can be any suitable logic block known in the art and can include one or more input terminals, one or more output terminals, one or more rail terminals, and/or one or more ground terminals.

The logic block can include any suitable logic gate configuration known in the art. For example, the logic block can implement a NAND logic gate, an AND logic gate, a NOR logic gate, an OR logic gate, an XOR logic gate, an XNOR logic gate, a NOT logic gate, a ONE logic gate, a ZERO logic gate, or a combination thereof. The at least one logic block can be fabricated using any suitable logic device, including transistors. The transistors can be field effect transistors have a source, drain, body, and gate.

In one embodiment, the logic block can be configured such that the body terminal of each transistor is coupled to the capacitor while the input to the at least one logic block transitions and coupled to the capacitor (e.g., floating) while the capacitor discharges and is charged.

In another embodiment, such as one in which the transistors are not fabricated in a common bulk CMOS process, at least one of the transistors can be formed in an isolated well. For example, the p-well of an n-channel device may be isolated from the substrate by an n-well layer.

Other circuit blocks can be configured in a similar manner as the digital logic blocks. For example, physically unclonable function (PUF) circuits, random number generators, entropy sources, analog circuitry (e.g., operational amplifiers, comparators), look-up tables, memory, and mixed signal circuitry, can operate under the control of the described charge distribution control arrangements. Therefore, where "logic block" is illustrated, it can be understood that digital, analog, and mixed circuit integrated circuit cells may be in the logic block's place.

FIG. 1 is a schematic diagram of a Clocked Charge Domain Logic (CCDL) cell according to an embodiment of the invention. Referring to FIG. 1, in an embodiment, a digital logic cell can include: a logic block 10 and a charge storage device (illustrated in this embodiment as capacitor 12) configured to supply power to the logic block 10 while decoupling the logic block 10 entirely from a power supply 14. The capacitor 12 decouples the logic block 10 from the power supply 14 through the use of a discharge switch 16; a switch 18 connecting the capacitor 12 to one of the power supply connections (e.g., high voltage rail); a switch 20 connecting the capacitor 12 to the other power supply connection (e.g., low voltage rail or ground); and two switches 22, 24 connecting the capacitor 12 to the power and ground lines of the logic block 10.

In order to discharge the capacitor 12, the discharge switch 16 can be closed while the other switches 18, 20, 22, 24 can be open such that the capacitor 12 is disconnected from the logic block 10 and the power supply 14, including the ground connection of the power supply 14. In order to charge the capacitor 12, the discharge switch 16 can be opened, along with switches 22 and 24, and switches 18 and 20 can be closed such that the capacitor 12 is connected to the power supply 14 while still disconnected from the logic block 10. Then, switches 18 and 20 can be opened to disconnect the capacitor 12 from the power supply 14, and switches 22 and 24 can be closed to connect the capacitor 12 to the logic block 10. Switches 18 and 20 can be opened before switches 22 and 26 are closed, thereby ensuring that the logic block 10 is not connected directly to the power supply 14 or the power supply connections of the logic cell.

Next, the input to the logic block 10 can be allowed to transition and the charge needed to power the transition(s) can be provided by the capacitor 12. This process can start at any point and/or can continue on in a cycle.

The switches 16, 18, 20, 22, and 24 can be controllable through, for example, a charge distribution controller that includes a signal generator providing switching signals to the switches. Control signals can be provided by the charge distribution controller according to various control schemes.

Figure 13:
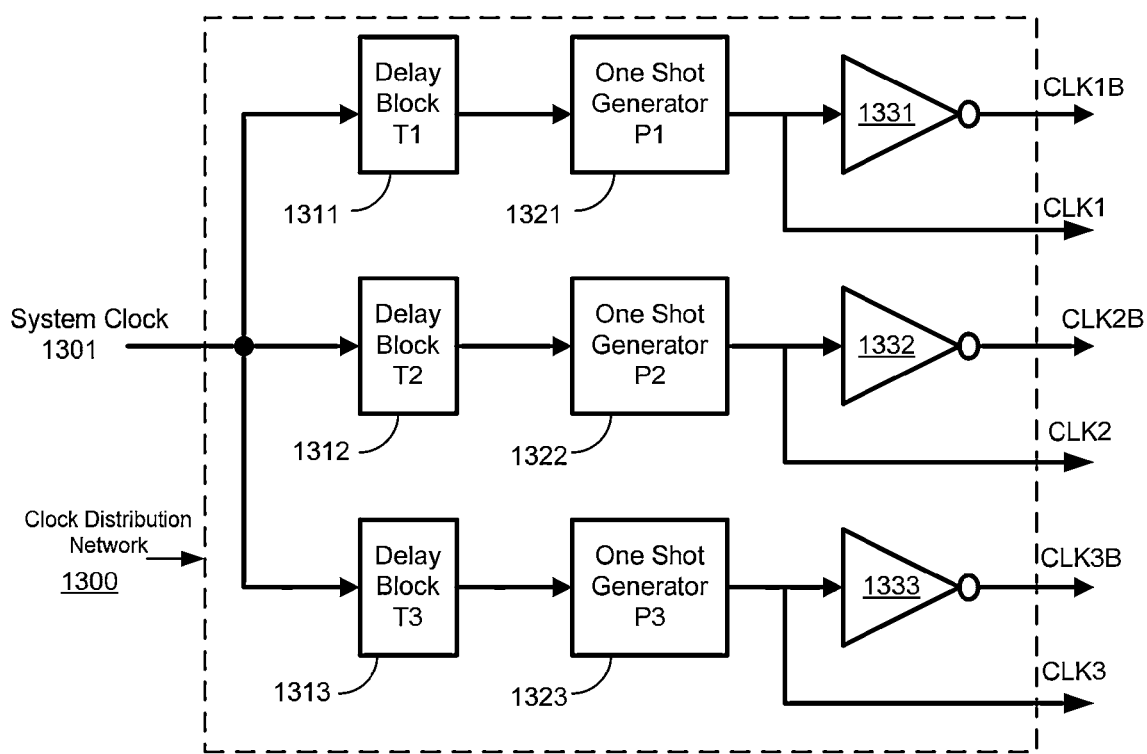
FIG. 13 illustrates a diagram of an example synchronous charge distribution clock generator that may be used for charge distribution control.
Figure 14:
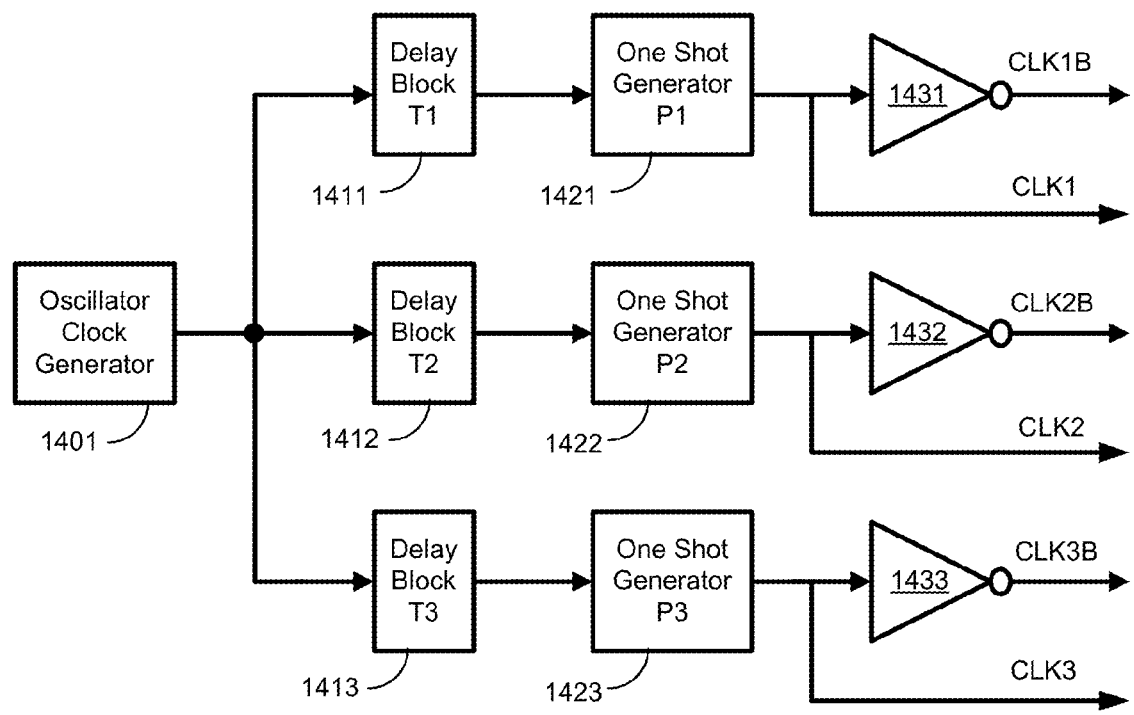
FIG. 14 illustrates a diagram of an example uncorrelated charge distribution clock generator that may be used for charge distribution control.

In some implementations, a clocking scheme may be used. FIGS. 13 and 14 show example clock signal generators that may be used for charge distribution control. A clocking scheme can involve three clock signals—one to control switch 16, one to control switches 18 and 20, and one to control switches 22 and 24.

Figure 15:
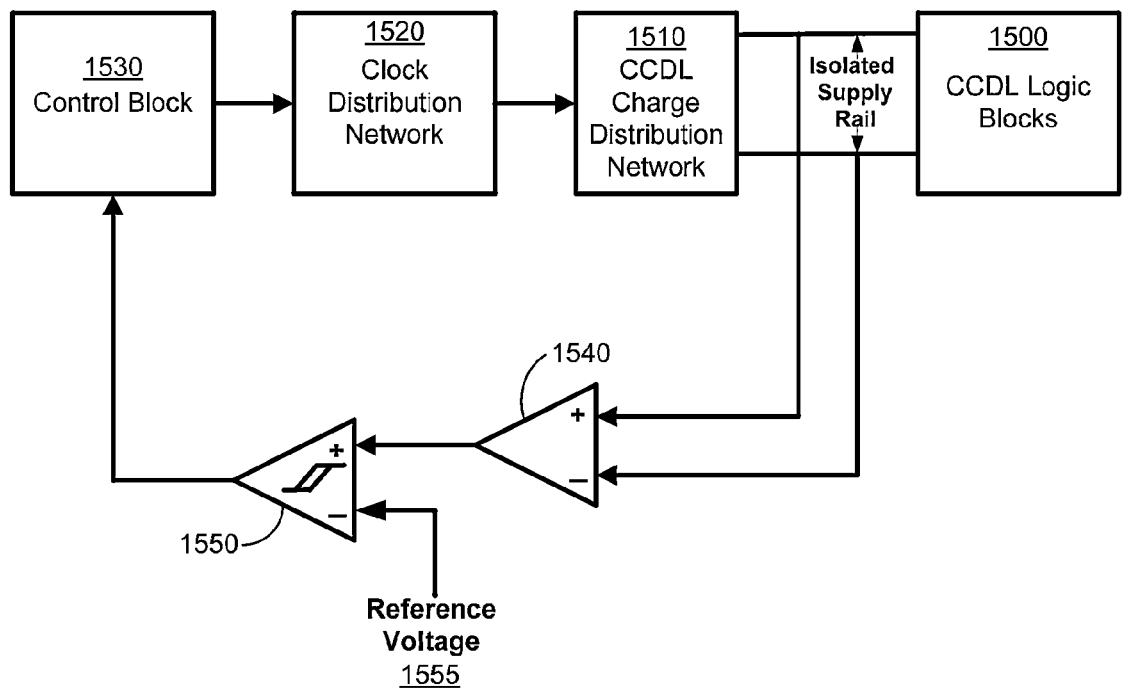
FIG. 15 illustrates a diagram of an example deterministic charge distribution clock generator that may be used for charge distribution control.

In another implementation, a charge distribution controller that includes a self-timing circuit may be used to control the switches 16, 18, 20, 22, and 24. FIG. 15 shows an example charge distribution control circuit. A self-timing circuit can include delay elements (analog or digital) such as, but not limited to, an inverter-based delay line, a voltage controlled delay line, a digitally controlled delay line, a dual loop delay locked loop, differential amplifier delay cell, analog delay locked loop, combinations thereof, and the like. Thus, although the schematic shown in FIG. 1 is referred to as a "clocked" charge domain logic cell, the power to and across the cell may be controlled via non-clocked methods.

Figure 17A:
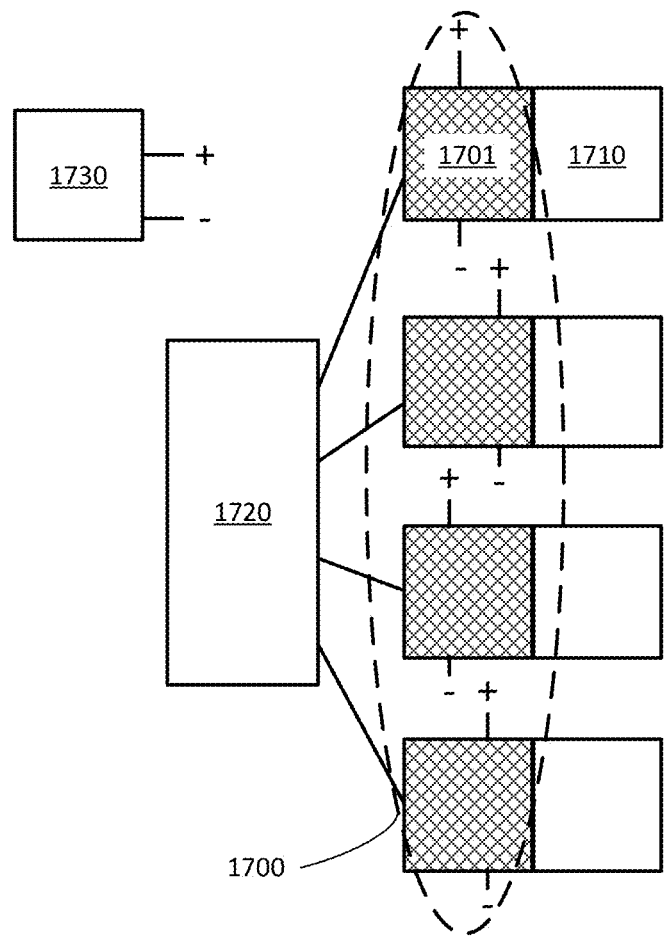
FIGS. 17A and 17B illustrate a charge distribution control system.
Figure 17B:
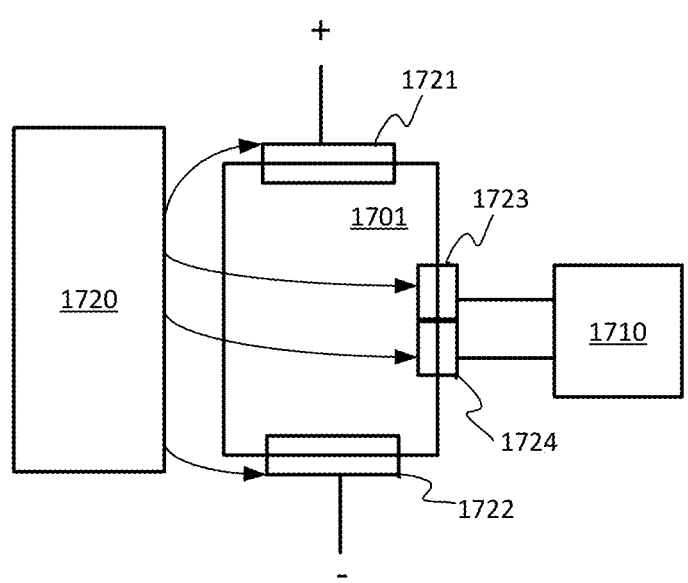

FIGS. 17A and 17B illustrate a charge distribution control system. As shown in FIG. 17A, a charge distribution control system includes a plurality of charge storage devices 1700. Each charge storage device 1701 provides power to a circuit element 1710 under the control of a charge distribution controller 1720. The charge distribution controller 1720 also controls connection of a power supply 1730 to each charge storage device 1701 of the plurality of storage devices 1700. As shown in FIG. 17B, the charge distribution controller provides signals for the charge storage device 1701 to connect and disconnect a power connection 1721 and a ground connection 1722 from power supply 1730 and a power connection 1723 and a ground connection 1724 to the circuit element 1710.

Although the charge storage device is described as a capacitor 12, it should be understood that the charge storage device may be any suitable charge storage device including active or passive elements.

Figure 2C:
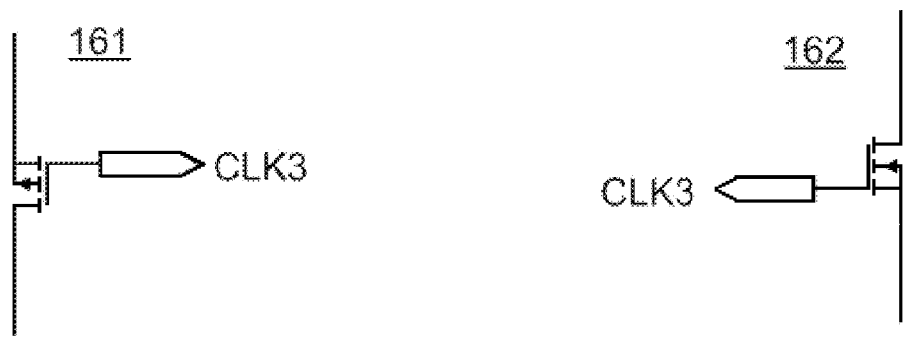
Figure 2C:
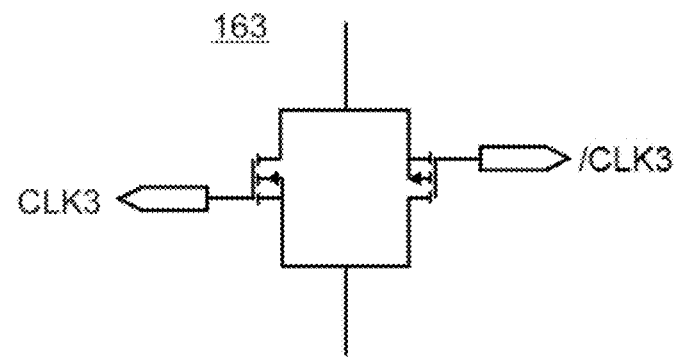

Each switch 16, 18, 20, 22, 26 can be any suitable switch known in the art. In certain embodiments, transistors, diodes, MEMS-based switches, and the like can be used as one or all of the switches. For embodiments using transistors as switches, any suitable transistor known in the art can be used, e.g., a bipolar junction transistor, a MOSFET, or a combination thereof. FIGS. 2A-2C show examples of discharge switches (16) according to various embodiments of the invention. Referring to FIGS. 2A-2C, the discharge switch 16 can be, for example, a PMOS (FIG. 2A), NMOS (FIG. 2B), or a transmission gate using a PMOS and NMOS transistor (FIG. 2C).

Figure 3A:
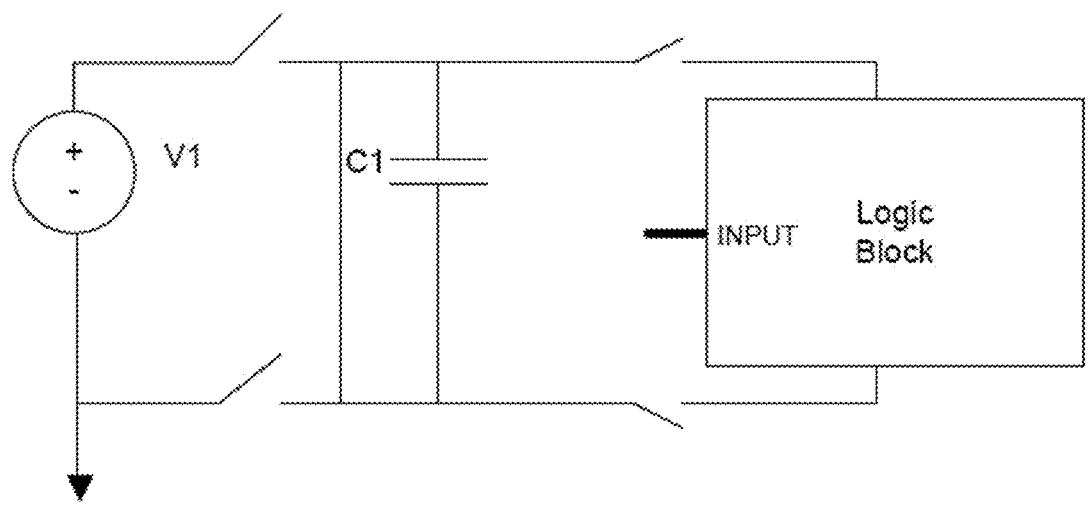
FIGS. 3A-3D illustrate a method of operation for a clocked charge domain logic cell according to an embodiment of the invention.

FIG. 3A is a schematic of a CCDL cell during a first phase according to an embodiment of the invention. Referring to FIG. 3A, the capacitor C1 (or other charge storage device) can be disconnected from the power supply V1 and the logic block to discharge the capacitor C1. The two terminals of the capacitor C1 can be coupled to each other to assist in discharging the capacitor C1. This can be accomplished using, e.g., switches such as transistors. The capacitor C1 can be disconnected from the power supply V1 using any suitable means known in the art, including one or more switches. Also, the capacitor C1 can be disconnected from the logic block using any suitable means known in the art, including one or more switches.

The capacitor C1 can be disconnected from the power supply V1 and the logic block for a period of time sufficient to discharge the capacitor C1 to a known charge level or potential, which can be zero Volts (V) or very close to zero V. According to certain embodiments, the capacitor is discharged to a voltage below a maximum discharge level for a logic transition and may be discharged to about 0 V. Also, when the capacitor C1 is disconnected from the power supply V1, the capacitor C1 is disconnected from the ground connection of the power supply V1.

The amount of time the capacitor can be disconnected from the power supply and the logic block to allow the capacitor to discharge can be, for example, any of the following values, about any of the following values, at least any of the following values, at most any of the following values, or within any range having any of the following values as endpoints, though embodiments are not limited thereto (all numerical values are in nanoseconds): 0.0001, 0.001, 0.01, 0.1, 1, 2, 3, 4, 5, 6, 7, 8, 9, 10, 15, 20, 25, 30, 40, 50, 100, 150, 200, 250, 300, 350, 400, 410, 420, 430, 440, 450, 460, 470, 480, 490, 500, 550, 600, 650, 700, 750, 800, 850, 900, 950, 1000, 1500, 2000, 3000, 4000, 5000, 6000, 7000, 8000, 9000, $10^4$, $10^5$, $10^6$, $10^7$, $10^8$, or $10^9$. For example, the amount of time the capacitor can be disconnected from the power supply and the logic block to allow the capacitor to discharge can be about 3 ns or about 455 ns. In certain embodiments, the two terminals of the capacitor C1 can be coupled to each other during this discharging time.

Figure 3B:
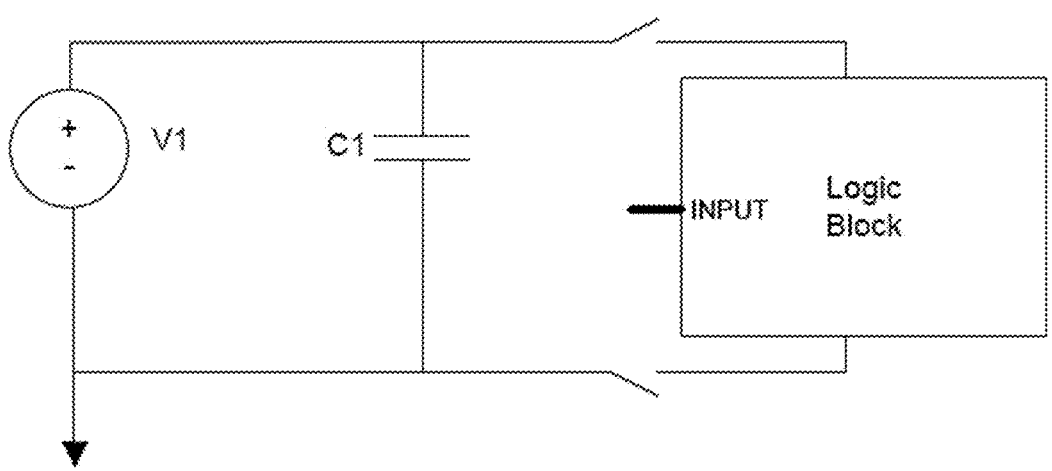

FIG. 3B is a schematic of the CCDL cell during a second phase according to an embodiment of the invention. Referring to FIG. 3B, the capacitor C1 can be connected to the power supply V1 while still disconnected from the logic block to charge the capacitor C1. The capacitor C1 can be connected to the power supply V1 using any suitable means known in the art, including one or more switches. In an embodiment, the capacitor C1 can be connected in parallel across the power supply V1. The capacitor C1 can be connected to the power supply V1 for a period of time sufficient to charge the capacitor C1 with a charge capable of powering the logic block.

The amount of time the capacitor can be connected to the power supply to allow the capacitor to charge can be, for example, any of the following values, about any of the following values, at least any of the following values, at most any of the following values, or within any range having any of the following values as endpoints, though embodiments are not limited thereto (all numerical values are in nanoseconds): 0.0001, 0.001, 0.01, 0.1, 1, 2, 3, 4, 5, 6, 7, 8, 9, 10, 15, 20, 25, 30, 40, 50, 100, 150, 200, 250, 300, 350, 400, 410, 420, 430, 440, 450, 460, 470, 480, 490, 500, 550, 600, 650, 700, 750, 800, 850, 900, 950, 1000, 1500, 2000, 3000, 4000, 5000, 6000, 7000, 8000, 9000, $10^4$, $10^5$, $10^6$, $10^7$, $10^8$, or $10^9$.

In an embodiment, a MOSFET can be used as the capacitor C1 and, when the capacitor C1 is disconnected from the power supply V1 and the logic block to discharge the capacitor C1, the gate of the capacitor C1 can be connected to the source, drain, and body terminals of the MOSFET used as the capacitor C1 to allow the capacitor to fully discharge. The gate of the capacitor C1 can be connected to the source, drain, and body terminals of the MOSFET using any suitable means in the art, including one or more switches which can be transistors as described herein. Then, when the capacitor C1 is connected to the power supply V1 while still disconnected from the logic block to charge the capacitor C1, the gate of the capacitor C1 can be disconnected from the source, drain, and body terminals of the MOSFET used as the capacitor C1. In another embodiment, the body of the MOSFET used as the capacitor is connected to the logic cell ground connection (e.g., CP_GD of FIG. 4). Then, when the gate of the MOSFET used as the capacitor C1 is connected to its source and drain, its body remains tied to the logic cell ground connection.

Figure 3C:
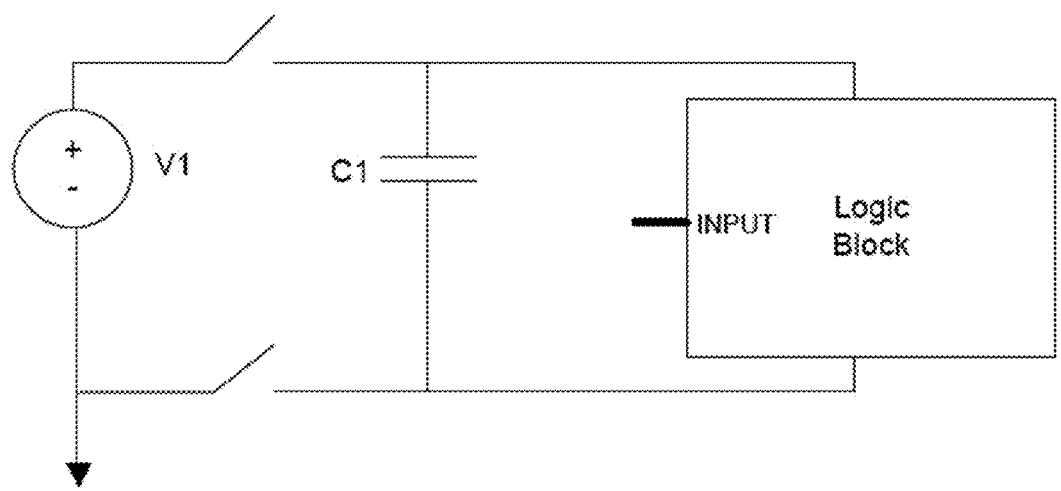

FIG. 3C is a schematic of the CCDL cell during a third phase according to an embodiment of the invention. Referring to FIG. 3C, the capacitor C1 can be disconnected from the power supply V1 and connected to the logic block to function as a power source for the logic block. The capacitor C1 can be connected to the logic block using any suitable means known in the art, including one or more switches. In an embodiment, the capacitor C1 can be connected in parallel across the logic block. Also, when the capacitor C1 is disconnected from the power supply V1, the capacitor C1 is also disconnected from the ground connection of the power supply V1.

Figure 3D:
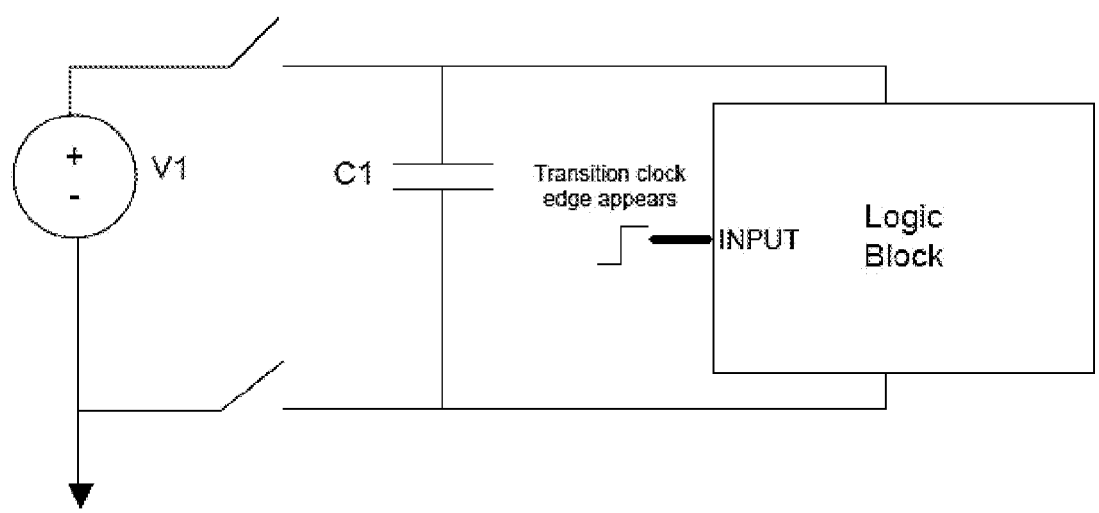

FIG. 3D is a schematic of a circuit during a fourth phase according to an embodiment of the invention. Referring to FIG. 3D, the input to the logic block can be allowed to transition (e.g., signal inputs can be provided) and the charge needed to power the transition(s) can be provided by the capacitor C1.

In certain embodiments, such as for bulk CMOS applications, the body terminal of each transistor within the logic block can be coupled to the capacitor during logic transitions, thereby inhibiting substrate currents (for NMOS transistors) or N-well currents (for PMOS transistors) from flowing into or out of the power supply. These currents could otherwise potentially be used to discern logic transitions within the logic block. In another embodiment, isolated wells in which at least one transistor is fabricated may be used to inhibit substrate currents.

The amount of time the capacitor can be connected to the logic block to allow the input to the logic block to transition can be, for example, any of the following values, about any of the following values, at least any of the following values, at most any of the following values, or within any range having any of the following values as endpoints, though embodiments are not limited thereto (all numerical values are in microseconds): $10^{-6}$, $10^{-5}$, $10^{-4}$, $10^{-3}$, 0.01, 0.1, 1, 2, 3, 4, 5, 6, 7, 8, 9, 10, 15, 20, 25, 30, 40, 50, 100, 150, 200, 250, 300, 350, 400, 410, 420, 430, 440, 450, 460, 470, 480, 490, 500, 550, 600, 650, 700, 750, 800, 850, 900, 950, 1000, 1500, 2000, 3000, 4000, 5000, 6000, 7000, 8000, 9000, $10^4$, $10^5$, $10^6$, $10^7$, $10^8$, or $10^9$.

Referring again to FIGS. 3A-3D, the basic operation of a CCDL logic cell according to an embodiment of the invention is described. In a first phase, represented as time=T1, the power supply V1 and the logic block can be disconnected from the capacitor C1. The two terminals of the capacitor C1 can be coupled to each other, and the capacitor C1 can be allowed to discharge. This step discharges the capacitor C1 to a known charge level during each cycling of the CCDL logic circuit operation.

In a second phase, represented as time=T2, the logic block remains disconnected from the rest of the CCDL circuit. The two terminal of the capacitor C1 can be disconnected from each other and coupled across the power supply V1. The capacitor C1 remains coupled across the power supply V1 for a period of time sufficient to allow the capacitor C1 to charge to a desired potential, e.g., the same or about the same voltage potential as the power supply V1.

In a third phase, represented as time=T3, the capacitor C1 can be disconnected from the power supply V1 and coupled to the logic block. Configured in this manner, the capacitor C1 can function as a power supply for the logic block.

In a fourth phase, represented as time=T4, the input to the logic block can be allowed to transition, and the charge needed to power the transition(s) can be provided by the capacitor C1. The body terminal of each transistor within the logic block can be coupled to the capacitor during logic transitions, thereby inhibiting substrate currents (for NMOS transistors) or N-well currents (for PMOS transistors) from flowing into or out of the power supply. These currents could otherwise potentially be used to discern logic transitions within the logic block. The operation cycle can then returns to the first phase, and the process can be repeated. This process can start at any phase and/or can continue on in a cycle.

By discharging the capacitor C1 in the first phase, the level of charge removed from the capacitor C1 during a logic transition is isolated from being sensed at the power supply because the charge remaining on the capacitor C1 after the fourth phase is removed from the capacitor C1 during the first phase (in which the capacitor is discharged before being connected back to the power supply). This configuration provided by embodiments of the invention can address varying charge from the capacitor because the charge consumed from the capacitor C1 by the logic block each time during the fourth phase can vary as transitions occurring within the logic block vary according to the inputs to the logic block, resulting in a varying quantity of charge removed from the capacitor C1 that may provide information that could potentially reveal the type of operation occurring within the logic block.

Additionally, using the CCDL approach, both the positive and return path to the power supply can be disconnected from the logic circuit, thereby advantageously removing any path for current used to charge or discharge nodes within the logic block from the power supply. All charge used for logic operations by the logic block are sourced from or returned the capacitor.

The four phases illustrated in FIGS. 3A-3D may be carried out under the control of a charge distribution controller. The charge distribution controller can be provided to control signals to the switches via a clocked or non-clocked technique. The particular timing for each of the four phases may be based on any number of factors. For example, in some cases, the charge storage device can be monitored and the discharging and recharging controlled based on whether the voltage on the charge storage device falls below a particular voltage threshold level.

In addition, in some implementations, additional phases in which the switches are connected and disconnected may be carried out and/or some of the phases may be carried out repeatedly. As an example, the charge distribution controller may provide signals to control the switches in a manner that the capacitor is connected to the power supply and disconnected to the power supply without being connected to the logic block or discharged and charged multiple times without being connected to the logic block (e.g., repeating phase 1 and 2). As another example, there could be a case where the capacitor is connected to both the power supply and the logic block due to a random charge distribution control.

In one example implementation, a non-overlapping clock circuit that produces five non-overlapping clock signals to drive the recharging cycle of a CCDL logic cell can be used. Of course, various embodiments may incorporate more or fewer clock signals. For example, at least two clock signals may be used, one clock for operating at a speed for performing the logic of the cell and another clock for connecting and disconnecting a charge storage device between a power supply and a logic block. In certain embodiments, it is not necessary to clock each individual logic cell. This can allow basic static logic cells to be paired with a CCDL power switching cell core.

Further embodiments may utilize clocking periods that are based on a logic transition, multiple transitions, and even random clocking.

In some implementations, the cells used to form secure circuits and systems can include a charge maintaining component (see e.g., transistor M9 of FIG. 4), which can be used to maintain charge on the rails even when the circuit is isolated from a power supply. Keeping charge stored in the cell can allow the logic cells to operate even when no power, noise, or variable power is applied to the rails. Accordingly, the timing of when to engage the isolated cell so that it can be connected to a power source is not required to be coordinated between the charge distribution control circuit and the logic block.

Figure 4:
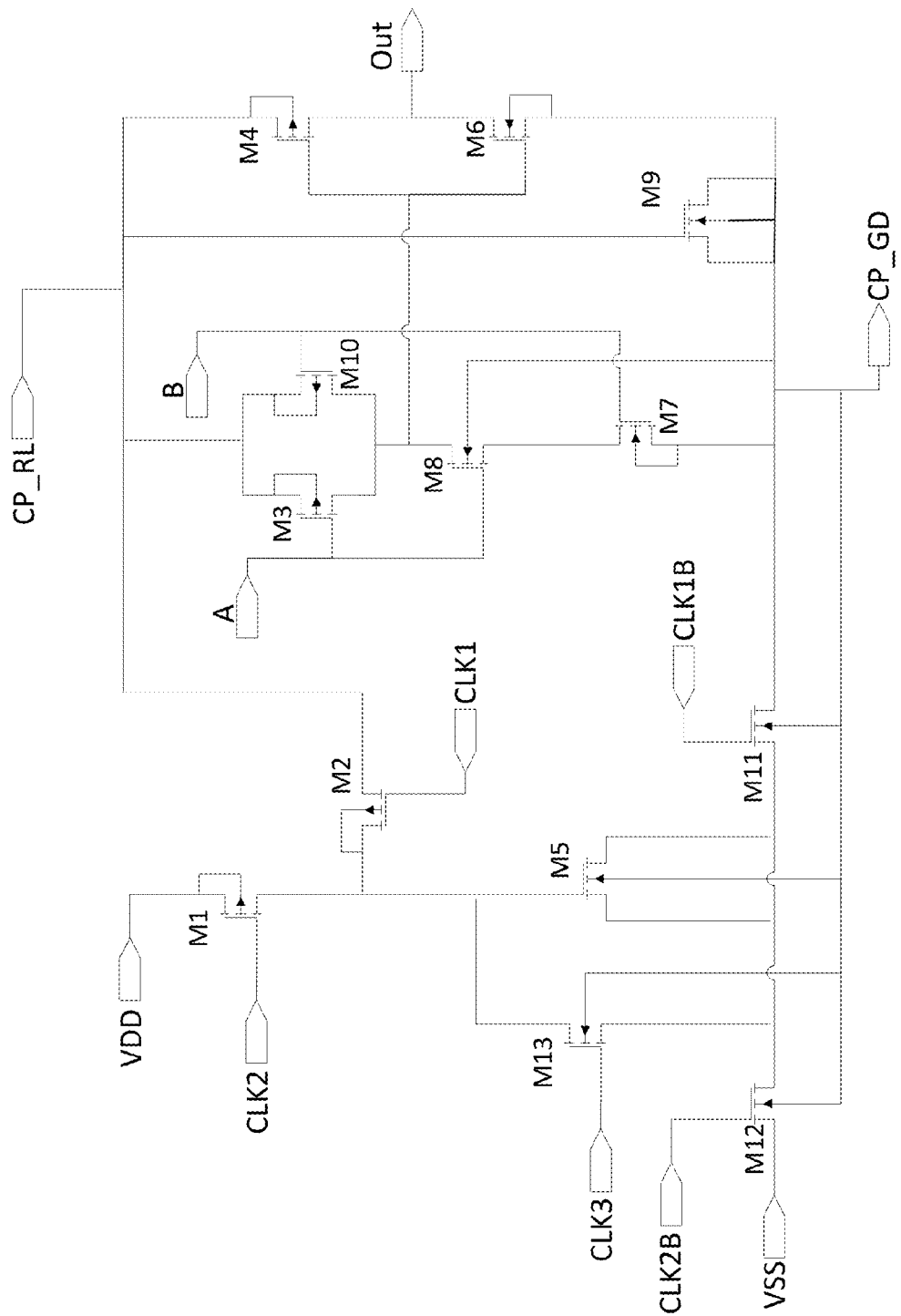
FIG. 4 is a simulation schematic of an example clocked charge domain logic cell according to an embodiment of the invention.
Figure 6:
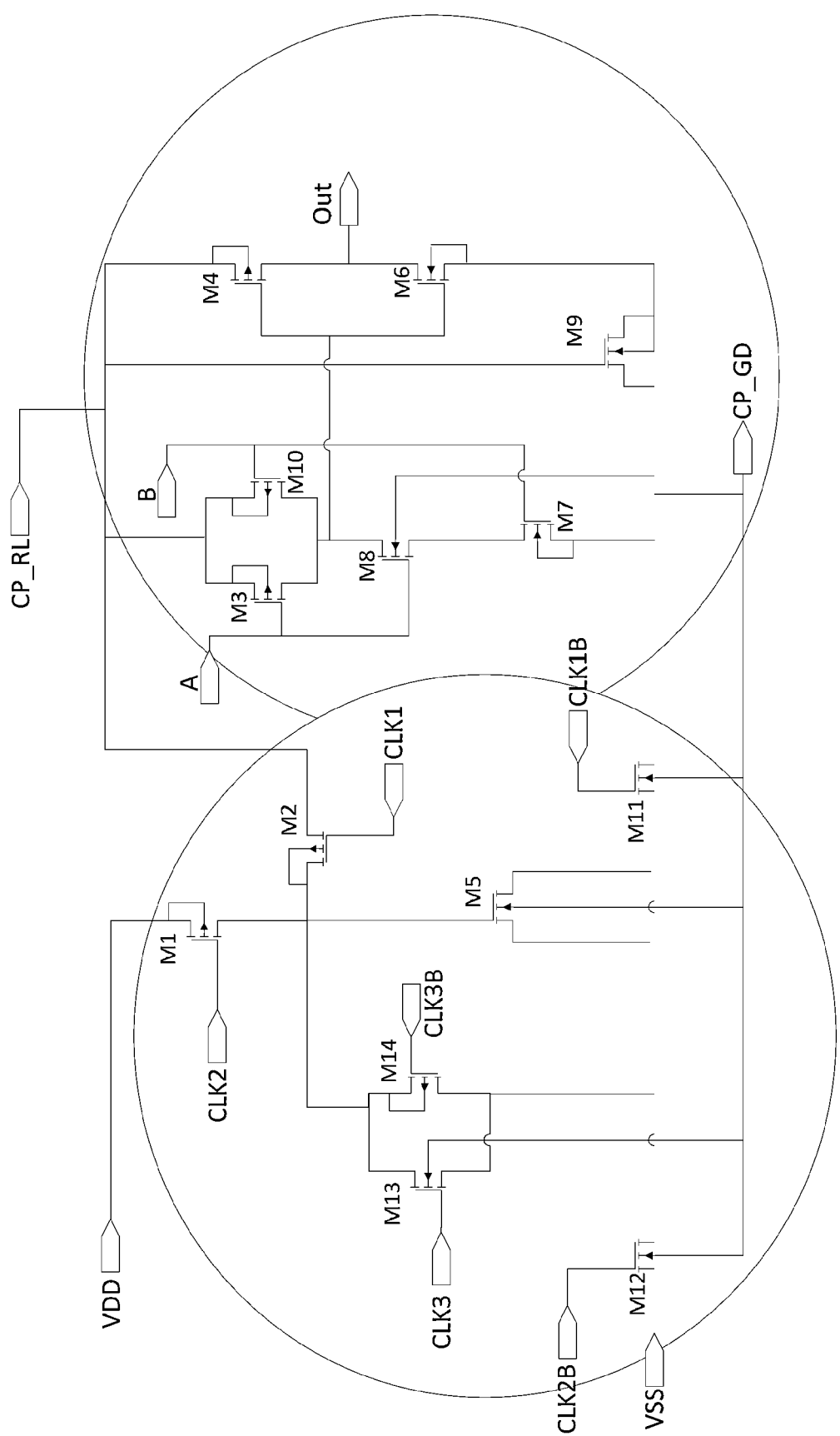
FIG. 6 is a simulation schematic showing the structure of a logic cell according to an embodiment of the invention.

Embodiments of the invention can be implemented with an AES encryption block. FIGS. 4 and 6 are simulation schematics showing example structures of a logic cell in which basic static logic cells (AND in the example) can be paired with a CCDL power switching cell core. Referring to FIG. 6, the left circle encloses the CCDL power switching core of the cell. A single NMOS transistor (FIG. 4) can be provided across the power capacitor to discharge it, thereby limiting the amount discharged by the capacitor to the threshold voltage ($V_{th}$) of the NMOS device used to short the two terminals of the power capacitor together. The addition of a PMOS device, thus implementing a transmission gate (FIG. 6), can allow the voltage across the power capacitor to fully discharge to zero V (or very close to zero V) during each charging cycle.

Figure 7:
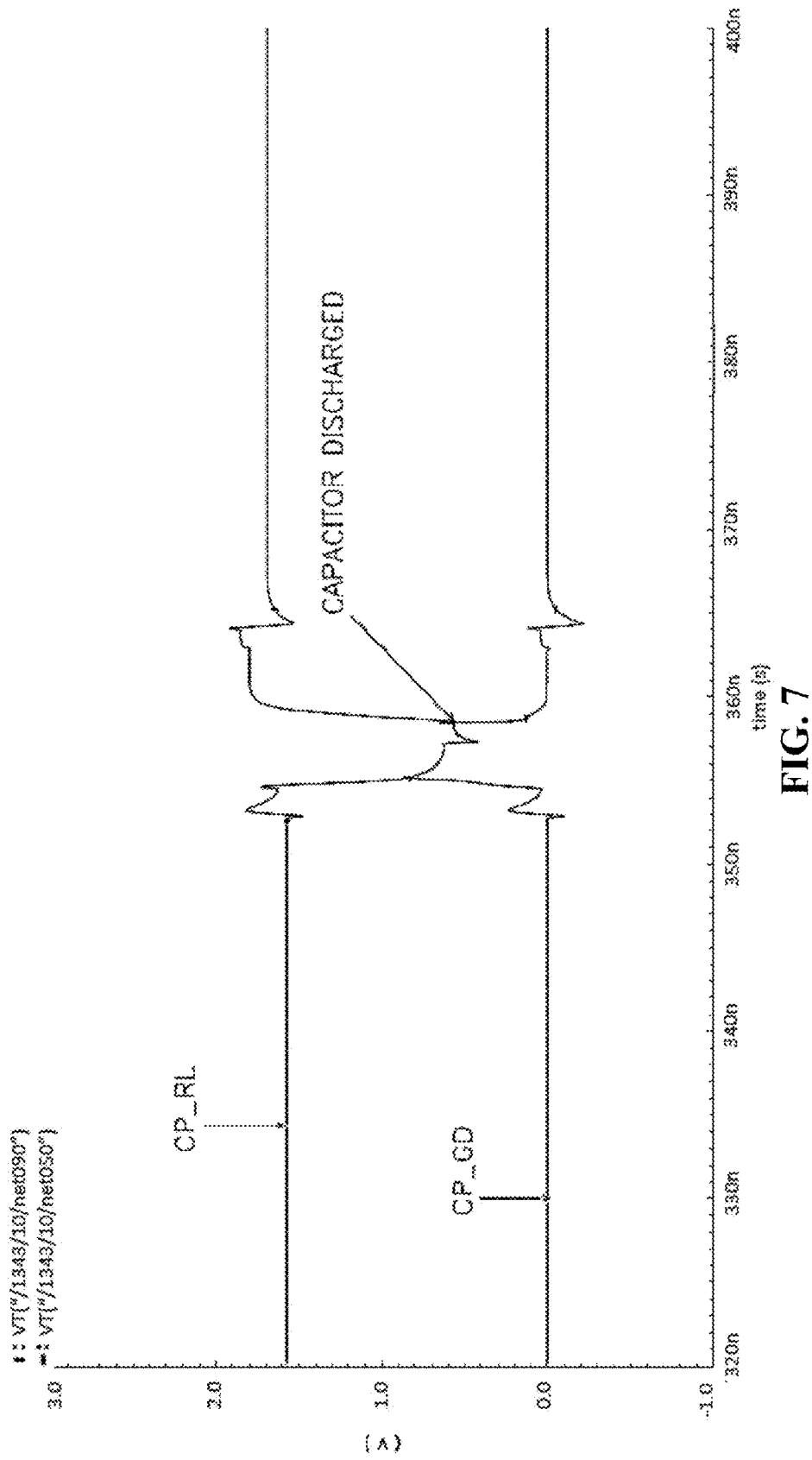
FIG. 7 is a plot of capacitor discharge.

FIG. 7 is a plot of capacitor discharge. Referring to FIG. 7, the improvement in the capacitor discharge level is shown. The central area (indicated as "capacitor discharged") shows the voltage across each side of the power capacitor as they are shorted during the discharge section of the recharging cycle of the CCDL cell. During the discharge cycle, each side of the power capacitor reaches the same voltage potential (e.g., no or nearly no charge remains across the power capacitor). This assures that during each cycle of the CCDL cell, the same charge is required to recharge the power capacitor.

The encircled area on the right side of FIG. 6 encloses the logic section of the CCDL cell. In this case the logic circuit implements a basic two-input AND gate. The ability to implement the logic within the CCDL cell with static logic allows the use of a pre-existing, low-power, low-area-consuming logic family. As a result, the design of a unique logic circuit to implement the basic logic functions required for an AES core is not necessary.

In an embodiment, guard rings can be used to surround an AES core to provide some level of junction isolation to further reduce the ability of substrate currents to reach the power supply. In a further embodiment, in non-bulk processes, n-well tubs (a relatively deep n-type active region in a p-type substrate) under sections of the CCDL cell can provide further isolation of the power supply from logic operation generated substrate currents from the CCDL cells.

In an embodiment, a Schmitt trigger buffer with internal hysteresis can be used at the interface of a CCDL circuit with standard CMOS static logic blocks (e.g., those used within a test integrated circuit). The noise immunity created by the hysteresis can inhibit the CCDL output signal from falsely triggering an interfaced standard CMOS logic cell.

The number of digital logic cells present in a block of digital logic cells can be, for example, any of the following values, about any of the following values, at least any of the following values, at most any of the following values, or within any range having any of the following values as endpoints, though embodiments are not limited thereto: 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1000, 1500, 2000, 3000, 4000, 5000, 6000, 7000, 8000, 9000, or 10000. For example, a block of digital logic cells can include 20 digital logic cells as described herein.

The clocking frequency of a digital logic cell can be, for example, any of the following values, about any of the following values, at least any of the following values, at most any of the following values, or within any range having any of the following values as endpoints, though embodiments are not limited thereto (all numerical values are in megahertz): $10^{-6}$, $10^{-5}$, $10^{-4}$, $10^{-3}$, 0.01, 0.1, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1000, 1500, 2000, 3000, 4000, 5000, 6000, 7000, 8000, 9000, or 10000. For example, the clocking frequency of a digital logic cell can be 10 MHz or about 10 MHz.

In some embodiments, the charge storage device is updated (i.e., charged) once every clock cycle, and the recharge cycle is initiated by the falling edge of the system clock. Thus, in the case where the clocking frequency of a digital logic cell is 10 MHz, all logic transitions within AES cells are completed in less than 50 ns. Assuming edge-clocked flip-flops are used within the AES encryption core, under these conditions, the completion of each propagated logic transition with an AES encryption block must complete within 25 ns. In other embodiments, the charge storage device is updated after a predetermined number of clock cycles such that multiple logic transitions may be performed on a single charge of the charge storage device. In one of such embodiments, the number of clock cycles may change either randomly or in a pattern. For example, the number of clock cycles between charging may be controlled via a random number generator (such that the charging takes place at random intervals).

In an embodiment of the invention, a method of fabricating a digital logic cell can include forming a charge storage device, connections for a power supply, and a logic block as described herein. The method can further include forming a switch on a line (or metal interconnection) for connecting two terminals of the charge storage device to one another, as well as switches between terminals of the charge storage device and the power supply and switches between terminals of the charge storage device and the logic circuit. Each switch can be, for example, a MOSFET. In a particular embodiment, a MOSFET can be used as the charge storage device by forming a MOS capacitor (or being connected in a way to provide capacitance), and the switch on a line (or metal interconnection) connecting the terminals of the capacitor can be provided on a line connecting the gate of the MOSFET to the source, the drain, and (optionally) the body terminal of the MOSFET. The method can also include forming a power supply to connect to the power supply connections. A plurality of such digital logic cells can be formed. In an embodiment, a single power supply can be formed to connect to all logic cells. In an alternative embodiment, one or more logic cells can share the same power supply (e.g., all logic cells can share the same power supply).

According to certain embodiments of the invention, a family of digital logic cells can be configured such that each cell is powered by a capacitor (or other charge storage device) during each logic transition by the cell. Following each logic transition (or a predetermined number of logic transitions or a random number of logic transitions or a random amount of time), the two terminals of the capacitor can connected together while the capacitor is disconnected from the logic cell and any power supply, thereby allowing the capacitor to discharge to a known level (e.g., zero V or very close to zero V). The capacitor can then be connected to a power supply to recharge the capacitor. This process disconnects each logic cell from the power supply during all logic transitions by the logic cell, thus isolating its power consumption from being sensed at the power supply powering the logic cell and greatly inhibiting passive attacks, such as DPA, on the logic cell.

According to embodiments of the invention, the logic cell is completely decoupled from the power supply and coupled only to a charge storage device. The discharging of the charge storage device after logic transition(s) within the logic block is an advantageous approach to disguise the charge consumed during each operation cycle of CCDL logic. The body terminal of each transistor within the logic block can be coupled to the charge storage device during logic transitions, thereby inhibiting substrate currents (for NMOS transistors) or N-well currents (for PMOS transistors) from flowing into or out of the power supply. These currents could otherwise potentially be used to discern logic transitions within the logic block.

In addition to protecting secure information from being read from current (whether during operation of off-current leakage), the charge distribution control and cell arrangements described herein can be used to protect secure information from being detected from acoustic, electromagnetic, heat, and/or power consumption information. Indeed, implementations may protect against any number of side channel attacks.

The following embodiments are provided to specify some configurations that may be implemented in accordance with the invention. The listing of the following embodiments should not be construed as exhaustive and are merely presented to illustrate some exemplary configurations. Other configurations are contemplated within the scope and spirit of this disclosure.

In a first embodiment, a secure digital logic cell is provided that includes a logic cell; and a charge storage device for providing power to the logic cell during logic operations, the charge storage device being controllably connected to a power supply during a charging operation and the logic cell during a logic operation, wherein during the logic operation, the charge storage device is not connected to a power and ground connection of the power supply. The charge storage device can be a discrete capacitor, a MOS capacitor, a MOS transistor, a charge coupled device, or the like. A similar configuration is available for other circuits and systems having analog, digital or a combination of analog and digital elements.

In a second embodiment, the secure digital logic cell of the first embodiment further includes a first switch for discharging the charge storage device. The first switch can be, for example, a transistor or a transmission gate.

In a third embodiment, the charge storage device of the first or second embodiment is fully discharged periodically between each logic operation of the logic cell or a predetermined number of logic operations of the logic cell.

In a fourth embodiment, the secure digital logic cell of any of the first through third embodiments further includes a second switch for connecting and disconnecting the charge storage device to the power connection of the power supply; a third switch for connecting and disconnecting the charge storage device to the ground connection of the power supply; a fourth switch for connecting and disconnecting the charge storage device to a power connection of the logic cell; and a fifth switch for connecting and disconnecting the charge storage device to a ground connection of the logic cell. The first, second, third, fourth, and fifth switches can each comprise a transistor.

In a fifth embodiment, the secure digital logic cell of any of the first through fourth embodiments further includes additional isolation switches between the power supply line and the power and ground rails connected to the secure digital logic cell. The isolation switches can be at least one sixth switch series connected between the power connection and the second switch and at least one seventh switch series connected between the ground connection and the third switch.

In a sixth embodiment, the logic cell of any of the first through fifth embodiments can include a plurality of transistors each having a body terminal, and wherein the body terminal of each transistor within the logic cell is coupled to at least one of the power connection of the logic cell and the ground connection of the logic cell.

In a seventh embodiment, a method of powering a logic block of a digital logic cell is provided, in which the digital logic cell comprises the logic block and a charge storage device and the method includes the steps of:
(a) disconnecting the charge storage device from the logic block and power and ground connections of the power supply;
(b) connecting the charge storage device to the power supply;
(c) disconnecting the charge storage device from the power supply, including disconnecting the charge storage device from the ground connection of the power supply; and
(d) connecting the charge storage device to the logic block for providing power to the logic block. The charge storage device can be a discrete capacitor, a MOS capacitor, a MOS transistor, a charge coupled device, or the like.

In an eighth embodiment, the method of the seventh embodiment can further include a step of (e) allowing an input of the logic block to transition while the charge storage device is connected to the logic block.

In a ninth embodiment, the logic block used in the eighth embodiment includes a plurality of transistors each having a body terminal, and wherein the body terminal of each transistor within the logic block is coupled to the charge storage device during step (e).

In a tenth embodiment, the logic block used in the eight embodiment is fabricated such that at least one of the transistors is in an isolated well. For example, a PN junction may be used to isolate a well from the substrate such that an n-well is isolated from the substrate by a p-type layer and/or a p-well is isolated from the substrate by an n-type layer.

In an eleventh embodiment, the method of any of the seventh through tenth embodiments further includes a step (f) disconnecting the charge storage device from the logic block after allowing the input of the logic block to transition. The charge storage device can be connected to the logic block for a predetermined number of transitions before being disconnected.

In a twelfth embodiment, the method of any of the seventh through eleventh embodiments can further include repeating all the steps (such as steps (a) through (f)) for as long as the logic block is powered.

In a thirteenth embodiment, in the method of any of the seventh through twelfth embodiments, step (a) can include discharging the charge storage device while the charge storage device is disconnected from the logic block and the power and ground connections of the power supply.

In a fourteenth embodiment, in the method of any of the seventh through thirteenth embodiments, step (b) charges the charge storage device after the charge storage device has been discharged; and step (c) is performed after the charge storage device is charged by the power supply.

In a fifteenth embodiment, in the method of any of the seventh through fourteenth embodiments, the charge storage device can include at least two terminals, and wherein discharging the charge storage device comprises connecting two terminals of the charge storage device to each other while the charge storage device is disconnected from the logic block and the power supply. The two terminals of the charge storage device can be connected to each other, while the charge storage device is disconnected from the logic block and the power supply, for a period of time sufficient to substantially, completely, or effectively discharge the charge storage device.

In a sixteenth embodiment, in the method of any of the twelfth through fifteenth embodiments, connecting the two terminals of the charge storage device to each other comprises closing a first switch connecting the two terminals of the charge storage device, and wherein disconnecting the two terminals of the charge storage device from each other comprises opening the first switch. The first switch may be a transistor, transmission gate, or the like.

In a seventeenth embodiment, in the method of any of the seventh through sixteenth embodiments, connecting the charge storage device to the power supply comprises closing a second switch and a third switch, the second and third switches connecting the charge storage device to the power supply, wherein disconnecting the charge storage device from the power supply comprises opening the second and third switches, and wherein connecting the charge storage device to the logic block comprises closing a fourth switch and a fifth switch, the fourth and fifth switches connecting the charge storage device to the logic block. The second, third, fourth, and fifth switches can each comprise a transistor, diode, MEMS switching device, or the like.

In an eighteenth embodiment, in the method of any of the eighth through seventeenth embodiments, step (e) can further include isolating the digital logic cell from the power connection of the power supply by opening all of at least one sixth switch series connected between the power connection of the power supply and the second switch; and isolating the digital logic cell from the ground connection of the power supply by opening all of at least one seventh switch series connected between the ground connection of the power supply and the third switch.

In a nineteenth embodiment, a charge distribution control can be applied to any of the first through eighteenth embodiments for controlling the charge distribution to the cells. The charge distribution control can involve clocked and/or non-clocked approaches as well as synchronous or asynchronous approaches. As non-limiting examples, the charge distribution control can include a synchronous charge distribution clock generator that uses the system clock to generate the control signals, an uncorrelated charge distribution clock generator that uses an on-chip and/or independent oscillator to generate the control signals, a deterministic charge distribution clock generator with feedback loop, and an asynchronous charge distribution clock generator that incorporates a random number generator with an oscillator or system clock to generate the control signals.

Embodiments of the invention can be implemented for secure applications.

In certain embodiments of the invention, a method or methods as described herein can be provided on or in a smart card or similar device. Such a smart card or similar device can be used in, for example, ATM cards, identification cards, stored value cards, credit cards, cellular telephones, computer access control, pay TV, and/or storage of medical information.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

EXAMPLE 1

FIG. 4 is a schematic representation of an implementation of a CCDL circuit according to an embodiment of the invention. Referring to FIG. 4, MOSFETs M1, M2, M11, M12, and M13 are used to implement the switches seen in FIGS. 1 and 3A-3D. MOSFET M5 is used to implement the capacitor C1. MOSFETs M3, M4, M6, M7, M8, and M10 implement a static logic "AND gate."

In a first phase, MOSFETs M1, M2, M11, and M12 are disabled (turned off) to decouple the logic block and the power supply from capacitor M5. Immediately following, M13 is enabled (turned on) to couple the gate of M5 to the source and drain terminals of M5, thereby allowing the M5 to discharge.

In a second phase, M2, M11, and M13 are disabled to decouple M5 from the logic block. MOSFETs M1 and M12 are then enabled to couple M5 to power supply lines VDD and VSS, thereby allowing M5 to charge.

In a third phase, MOSFETs M1, M12, and M13 are disabled to disconnect M5 from supply lines VDD and VSS. Immediately after, MOSFETs M2 and M11 are enabled, thereby coupling M5 to the logic block.

In a fourth phase, inputs A and B are allowed to transition, if applicable, and the charge necessary to allow the transitioning of logic states within the logic block is sourced from M5. It should be noted that, the body connection of each of the PMOS devices within the logic block is tied to the internal rail terminal (CP_RL), and each of the body connections of each of the NMOS devices of the logic block are connected to the internal ground terminal (CP_GD). Each of these supply rails, i.e., CP_RL and CP_GD, within each CCDL logic cell can be coupled to the corresponding supply rail within each other CCDL logic cell used within a larger CCDL block. As a result, during a CCDL operation cycle, devices within the logic cell and their body connections can be alternately floated, e.g., in the first and second phases, and then coupled to supply capacitor M5, e.g., during the third and fourth phases. The isolation of the body connection during logic transitions removes a significant path for current, generated by transitions occurring within the logic block, from flowing into the power supplies powering a CCDL cell.

Shown in the schematic, but not yet described is MOSFET M9. A component such as M9 may be present in some implementations. Here, M9 serves to store some charge to help maintain the voltage potential difference between CP_RL and CP_GD when the logic block is disconnected from the charge storage device. M9 also serves to bypass high frequency noise that may be injected onto either of the rails CP_RL or CP_GD.

EXAMPLE 2

Figure 5:
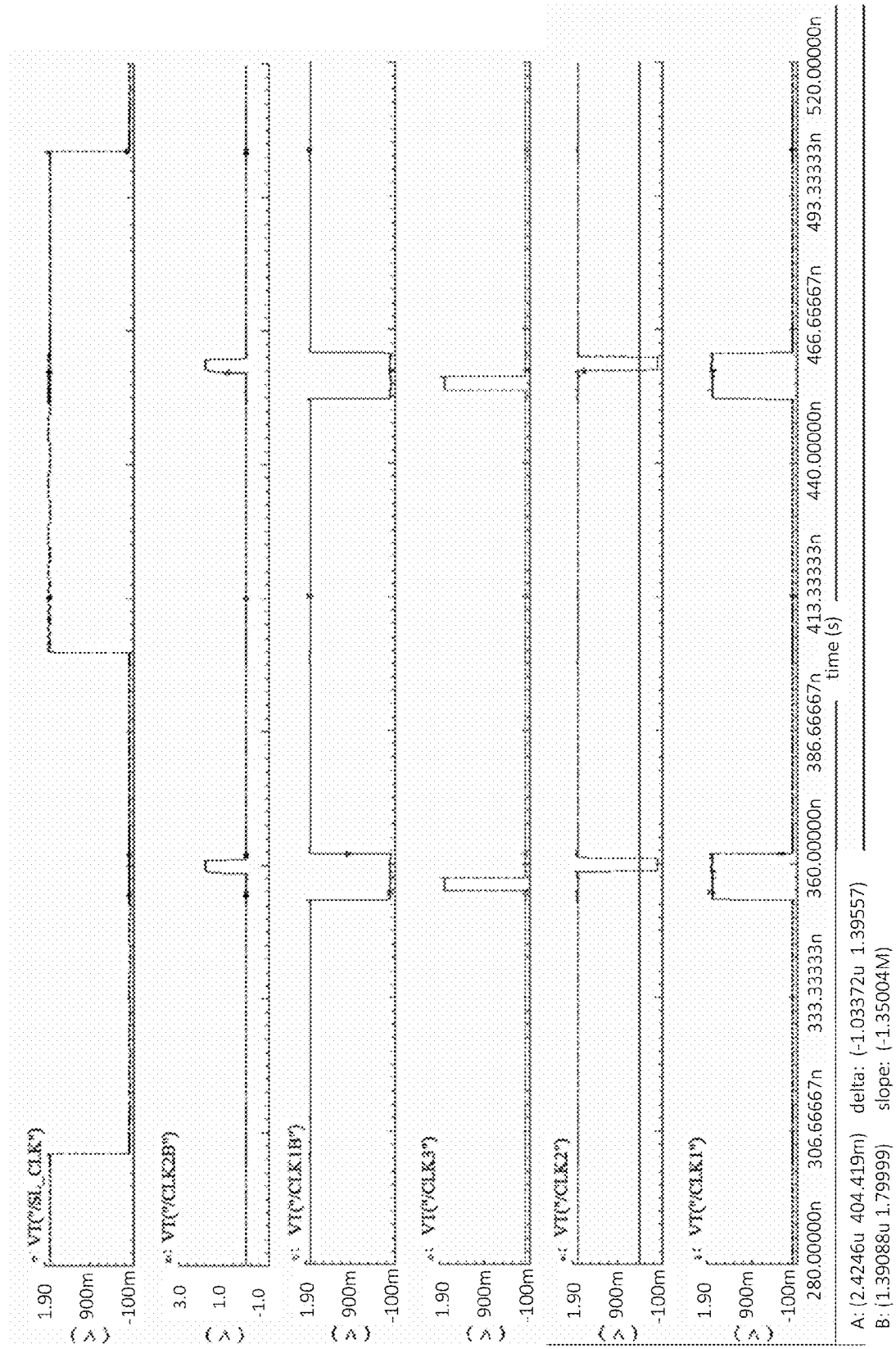
FIG. 5 is a clocking scheme for a logic cell according to an embodiment of the invention.

FIG. 5 shows a clocking scheme for a CCDL logic cell. The signal SL_CLK represents an input to a CCDL cell that would induce a logic transition. The transitioning of signals CLK1 and CLK1B disconnects the logic block from the supply capacitor and the power supply. The limiting factor in determining the max operation speed of a CCDL cell or a CCDL based circuit block is the necessity for all logic transitions within the CCDL block to be complete before CLK1 and CLK1B signals disconnect the logic block within the CCDL cells from the supply capacitor powering the logic blocks.

Once the CLK1 and CLK1B signals have decoupled the logic block from the supply capacitor, CLK3 can transition and discharge the supply capacitor. Finally, CLK2 and CLK2B signals transition to allow the supply capacitor to be charged by the power supply. It should be noted that, the transition edges of each of the CLK signals do not overlap. The non-overlapping clocks inhibit, for example, the power supply lines being momentarily coupled across the logic block or the supply cap being coupled to the supply lines while the terminals of the supply cap are being shorted.

EXAMPLE 3

A CCDL cell as shown in FIG. 6 was tested. The discharge switch for the cell in this example utilizes a transmission gate of NMOS transistor M13 and PMOS transistor M14. Testing of the CCDL cells within a larger circuit demonstrated a small but significant level of current, i.e., tens of micro amps, flowing through the substrate of the circuit and into the power supply during switching events of the CCDL logic. Although small, some level of information may have been extractable from these currents about the logical operations of the CCDL circuit. Two approaches were implemented to reduce this. First, the body tie of each device in the CCDL logic cell (circled on the right) was tied to the internal supply rails of the CCDL cell, i.e., CP_RL and CP_GND. This attempts to flow as much of the substrate current generated during logic operations as possible into, and/or out of, the power capacitor.

Figure 8:
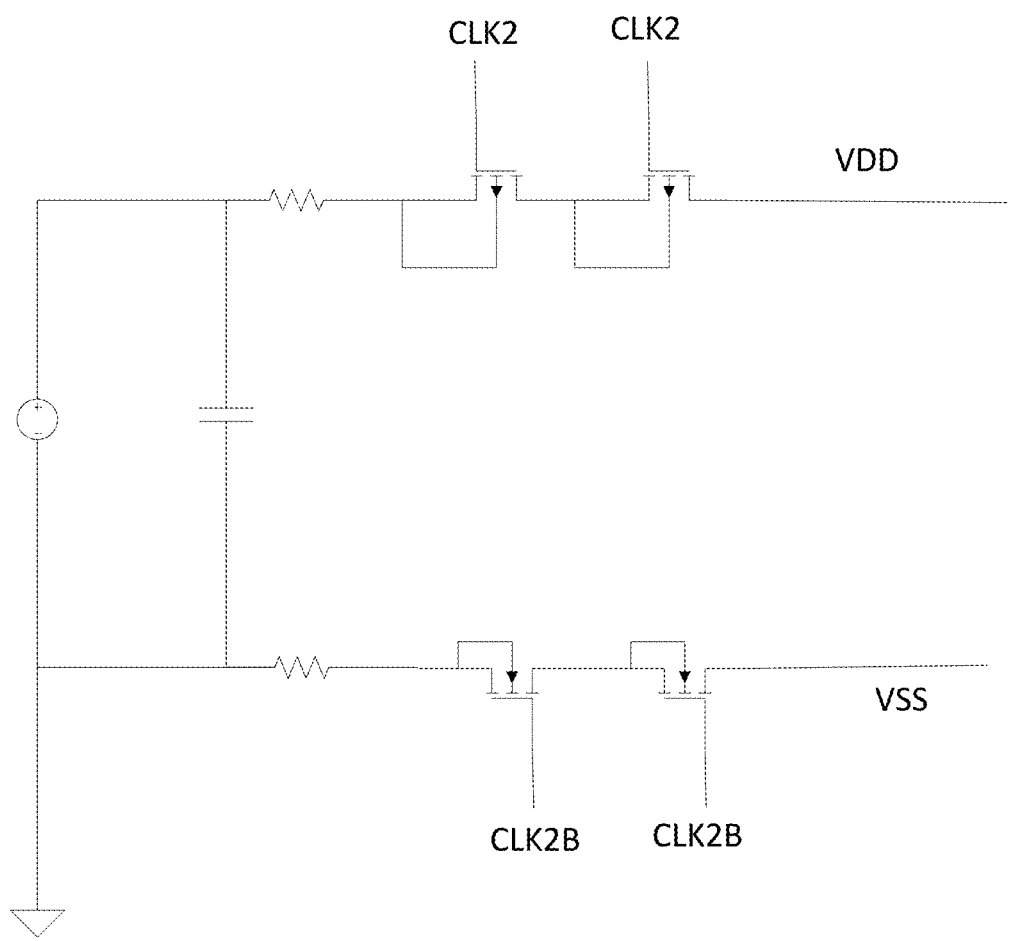
FIG. 8 is a circuit schematic according to an embodiment of the invention.
Figure 9A:
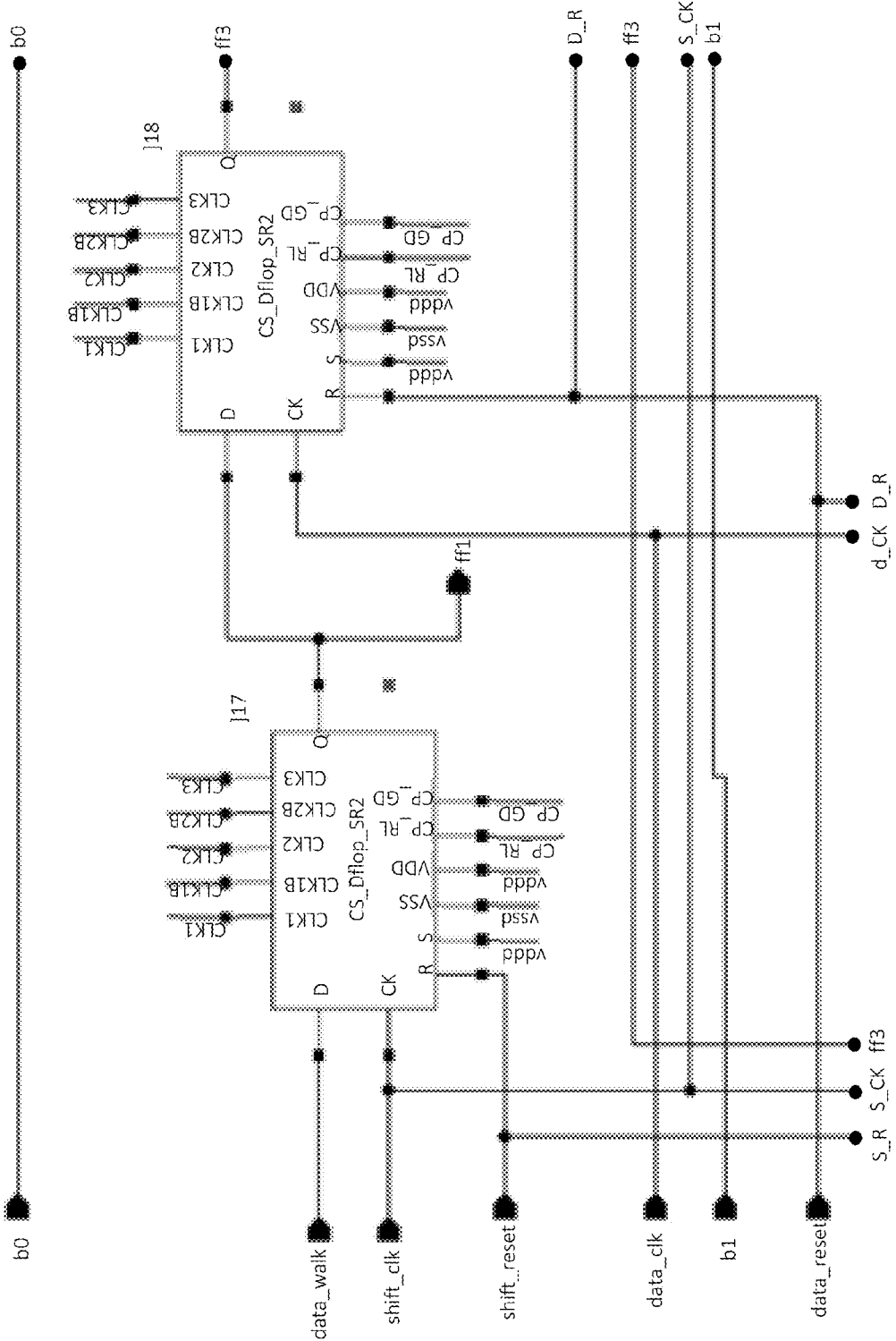
FIGS. 9A-9D, combined, is a circuit schematic of an implementation of a two-bit encryption block according to an embodiment of the invention.
Figure 9B:
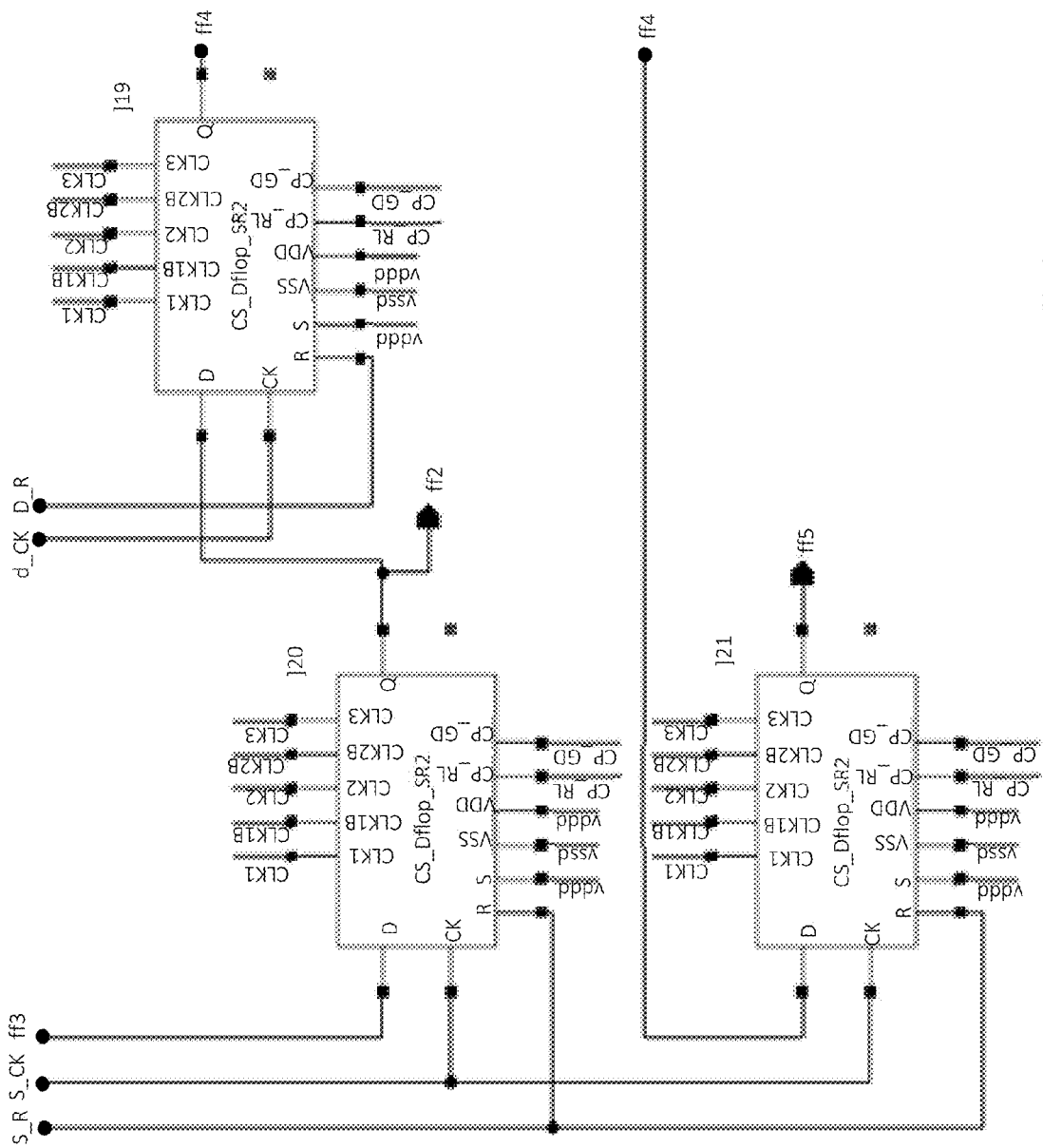
Figure 9C:
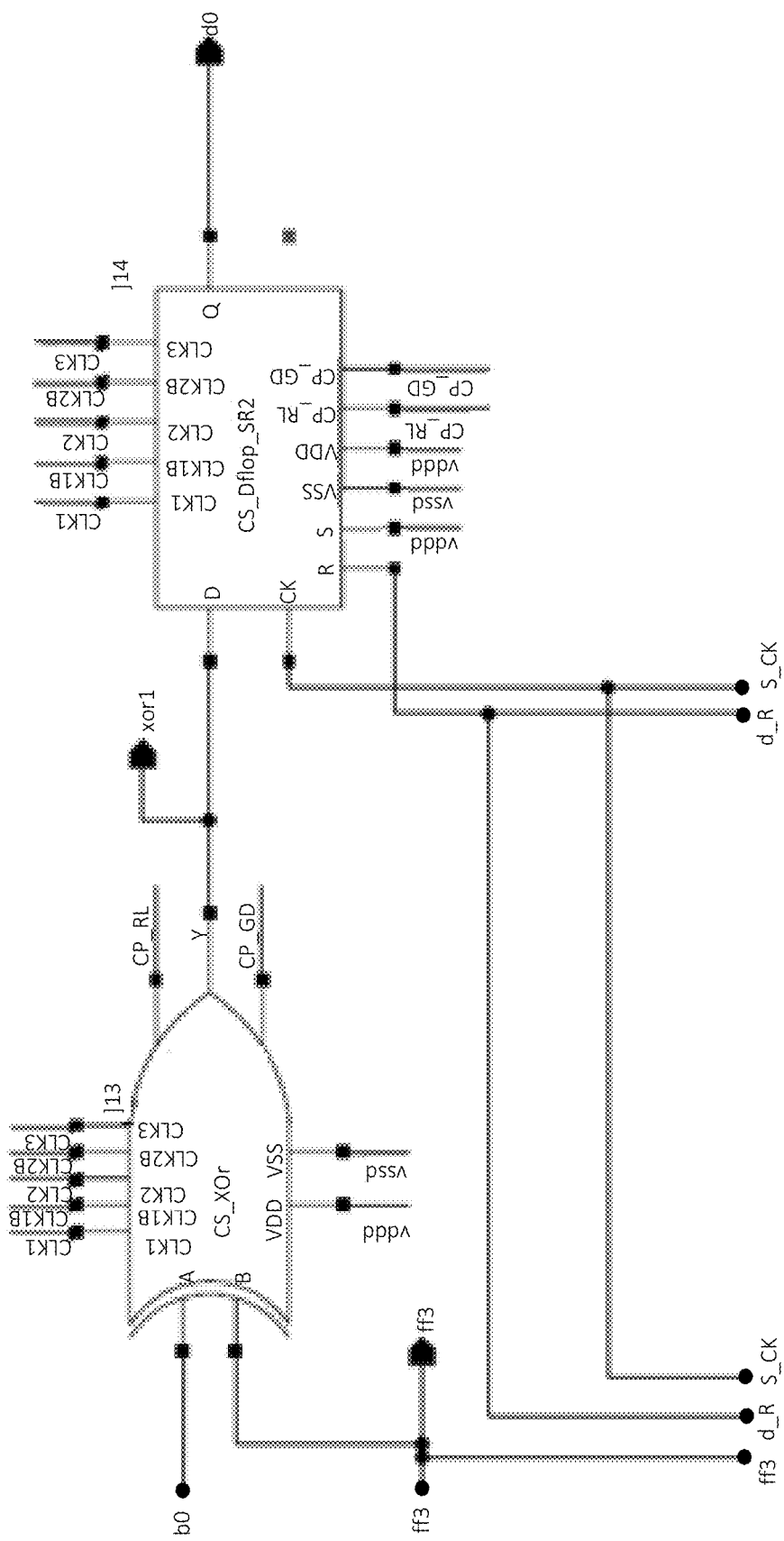
Figure 9D:
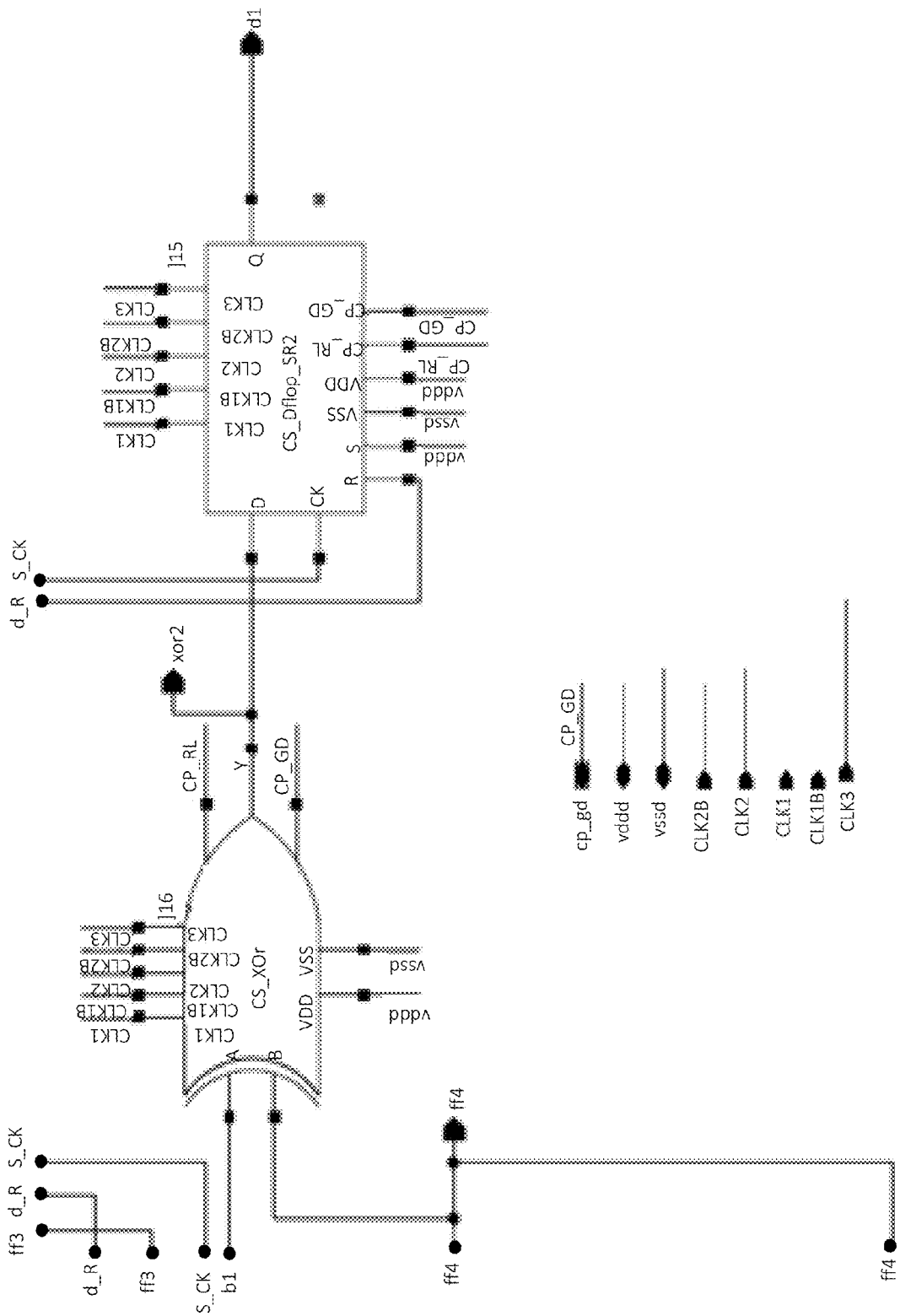

The second approach used to reduce current on power and ground lines is shown in FIG. 8. FIG. 8 is a circuit schematic according to an embodiment of the invention, showing a series of switches used to isolate the VDD and VSS rails of the CCDL cells from the external power supply powering a CCDL circuit during logic switching events, thereby inhibiting substrate current from flowing between the two. Although two transistors (as switches) are shown in FIG. 8 for each rail line, embodiments are not limited thereto and more or fewer switches may be included.

EXAMPLE 4

Figure 10:
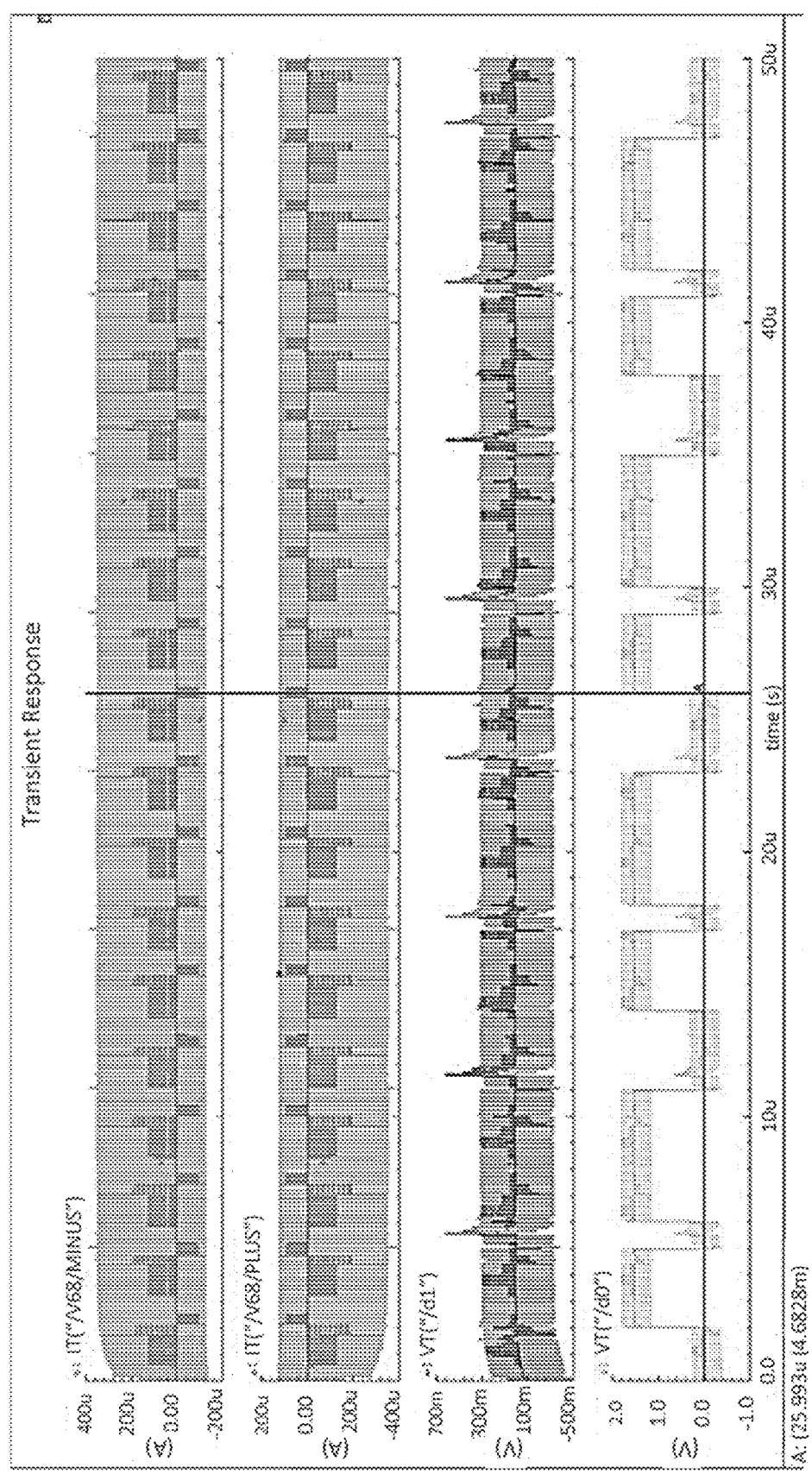
FIG. 10 is a plot of signals associated with the operation of the encryption block of FIG. 11.

A two-bit encryption block was generated with CCDL cells to test the functionality of the CCDL cells within a larger circuit. FIGS. 9A-9D, combined, is a schematic drawing of the CCDL implementation of a two bit encryption block. FIG. 10 is a collection of signals associated with the operation of the encryption block.

Figure 11:
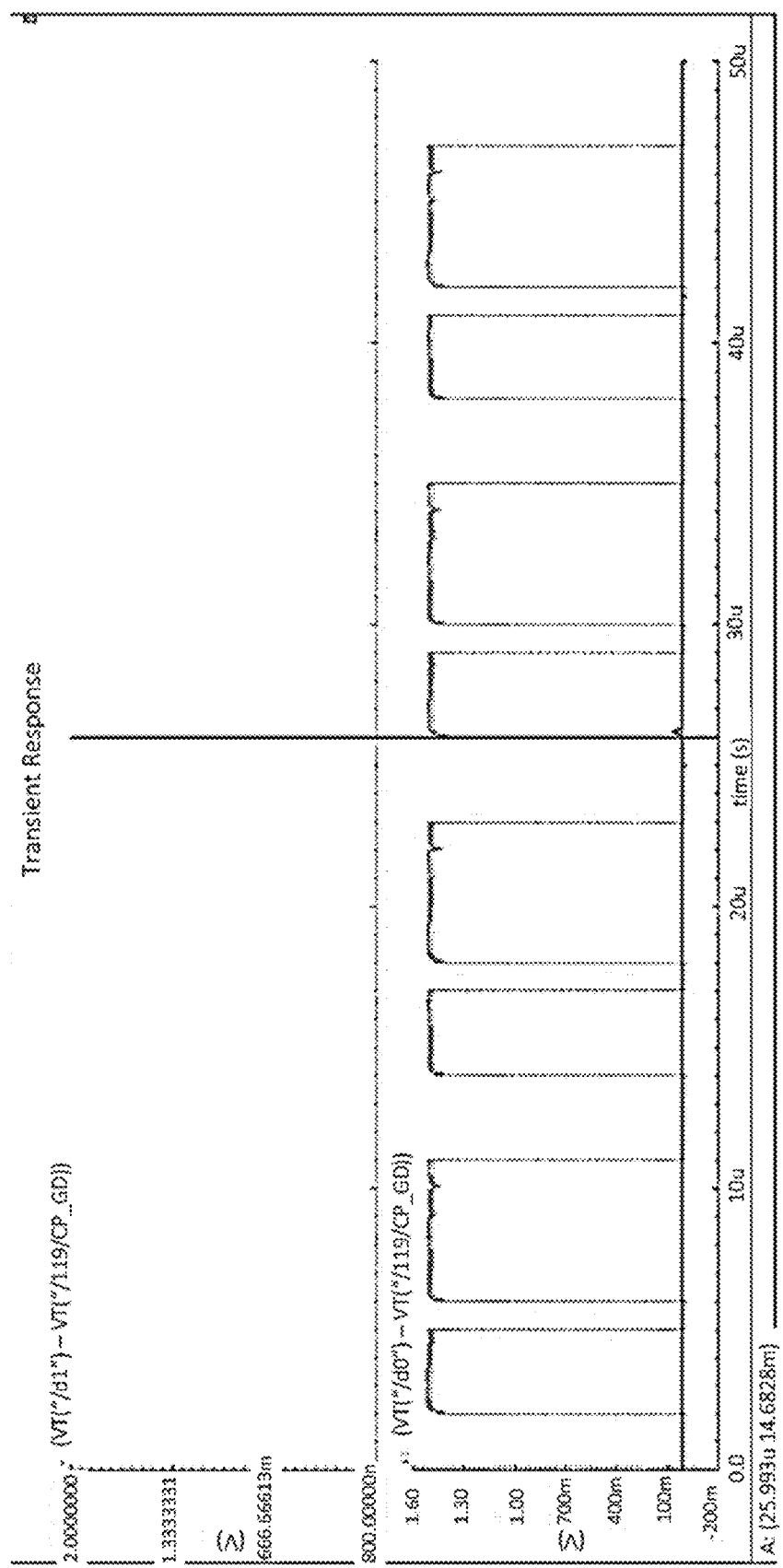
FIG. 11 is a plot of an output signal referenced to internal logic rails within a CCDL cell according to an embodiment of the invention.

The top two signals in FIG. 10 are the current output and ground return currents to the power supply powering the two bit encryption block. The bottom two signals in FIG. 11 are the two output bits from the encryption block. Referring to FIG. 10, a large amount of ripple rides on top of the digital output signal. Although this ripple is large, suggesting a low noise margin to the CCDL cells, it results from the two output signals being referenced to the supply ground. As the logic block within each CCDL cell is floated during the recharge cycle of CCDL operation, the voltages within the cell are no longer referenced to the power supply.

FIG. 11 shows the same two-bit output signal referenced to internal logic rails within the CCDL cell. Referring to FIG. 11, the noise margin is greatly increased when viewed in this manner. As the internal supply rail for each CCDL is coupled together within the encryption block, the signals in FIG. 11 more plainly represents the noise margin of a CCDL signal within a CCDL circuit.

Figure 12:
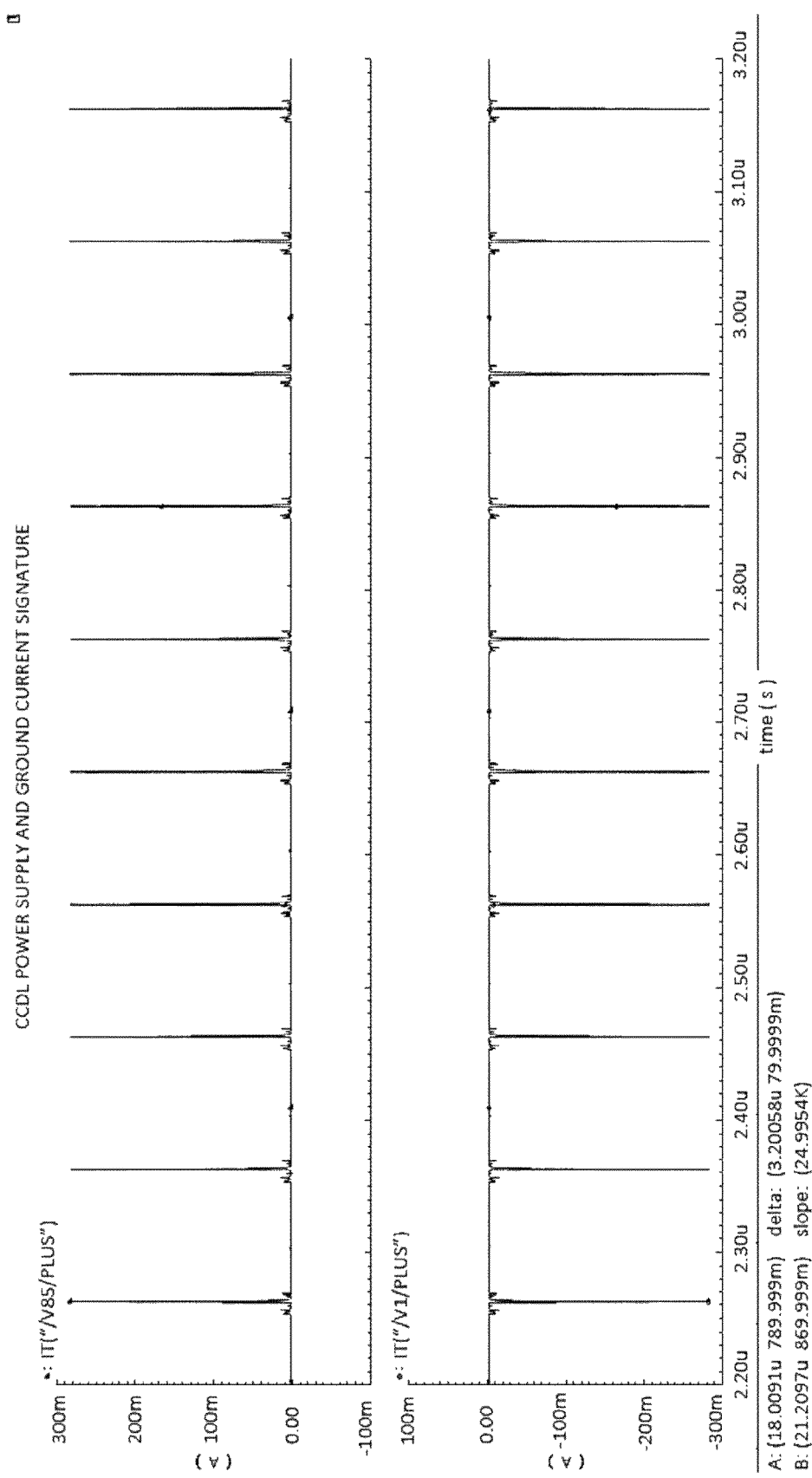
FIG. 12 is a plot of a power supply signature of an AES encryption core made of CCDL cells according to an embodiment of the invention.

FIG. 12 is a plot of a power supply signature of an AES encryption core made of CCDL cells according to an embodiment of the invention.

EXAMPLE 5

Charge distribution control may be carried out through any number of controllers, including digital, analog, and mixed signal-based controllers. Some controllers may be clock-based, some may involve self-timing circuits, and other controllers can include feedback mechanisms based on logic states or particular operations of the secure circuit or system. FIGS. 13-16 illustrate some non-limiting examples.

FIG. 13 illustrates a diagram of an example synchronous charge distribution clock generator that may be used for charge distribution control. Referring to FIG. 13, a clock distribution network 1300 can receive a system clock 1301 and distribute the clock through a delay block 1311, 1312, 1313 and a one-shot (pulse width) generator 1321, 1322, 1323 to output three control signals (and corresponding inverse signals once passed through an inverter 1331, 1332, 1333). The delay introduced to each parallel control signal line by the delay blocks 1311, 1312, 1313 as well as the corresponding pulse width adjustments via the one shot generators 1321, 1322, 1323 can be selected according to design.

FIG. 14 illustrates a diagram of an example uncorrelated charge distribution clock generator that may be used for charge distribution control. Referring to FIG. 14, a similar design as with the synchronous charge distribution clock generator is presented; however, instead of using the system clock 1301, a separate oscillator or clock generator 1401 provides a signal that is then distributed to delay blocks 1411, 1412, 1413, and one-shot (pulse width) generators 1421, 1422, 1423 to provide the control signals (e.g., CLK1, CLK2, CLK3) and corresponding inverse signals once passed through an inverter (1431, 1432, 1433).

FIG. 15 illustrates a diagram of an example deterministic charge distribution clock generator that may be used for charge distribution control. Referring to FIG. 15, CCDL logic blocks are powered by a CCDL charge distribution network 1510, which is operated by a clock distribution network 1520 controlled by a control block 1530. The control block 1530 can take into consideration the voltage across the isolated supply rails when controlling the clock distribution network 1520 and switches of the charge distribution network 1510. For example, a differential amplifier 1540 can be configured as a buffer to measure the voltage across the isolated supply rails that power the logic blocks 1500. The output of the differential amplifier 1540 can be used as input to a non-inverting input of a comparator 1550, comparing the voltage from the isolated supply rail to a reference voltage 1555 connected to the inverting input of the comparator 1550. The comparator 1550 may be a hysteresis amplifier.

Figure 16:
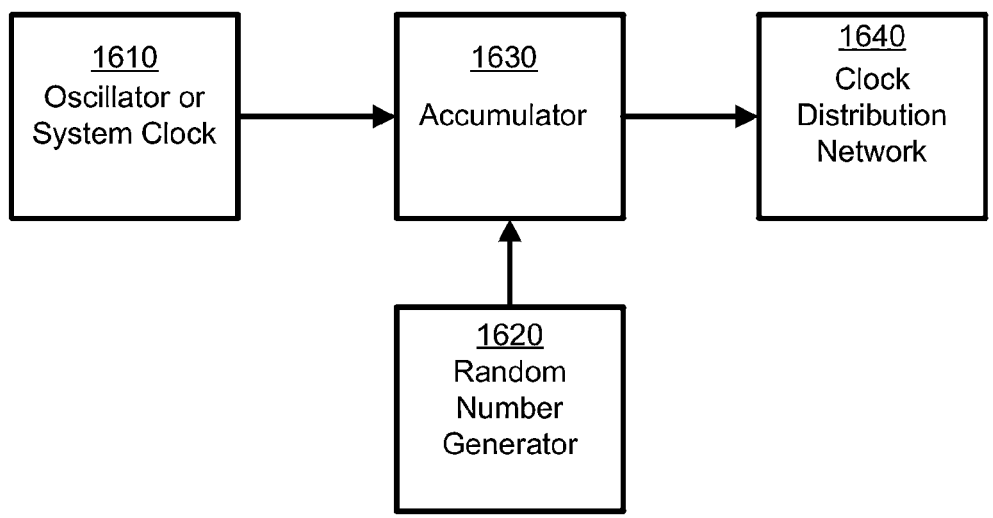
FIG. 16 illustrates a diagram of an asynchronous charge distribution clock generator that may be used for charge distribution control.

FIG. 16 illustrates a diagram of an asynchronous charge distribution clock generator that may be used for charge distribution control. Referring to FIG. 16, an oscillator or system clock 1610 and a random number generator 1620 may be input to an accumulator 1630, which is used to control a clock distribution network 1640. The clock distribution network 1640 can provide the signals to control the charge distribution network of charge storage devices for the various blocks (logic or analog) of the system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

We claim:

1. A secure system, comprising:
    a charge storage device;
    a circuit block; and
    a charge distribution controller, wherein the charge distribution controller supplies a first signal to connect and disconnect the charge storage device from a power connection of a power supply, a second signal to connect and disconnect the charge storage device from a ground connection of the power supply, a third signal to connect and disconnect the charge storage device from a power connection of the circuit block, and a fourth signal to connect and disconnect the charge storage device from a ground connection of the circuit block.

2. The secure system of claim 1, wherein the circuit block comprises an analog circuit block.

3. The secure system of claim 1, wherein the circuit block comprises a digital logic block.

4. The secure system of claim 1, wherein the charge distribution controller further supplies a fifth signal for discharging the charge storage device.

5. The secure system of claim 1, wherein the charge distribution controller comprises a clock generator for generating the first signal, the second signal, the third signal, and the fourth signal.

6. The secure system of claim 5, wherein the clock generator comprises an uncorrelated charge distribution clock generator.

7. The secure system of claim 5, wherein the clock generator comprises a deterministic charge distribution clock generator.

8. The secure system of claim 5, wherein the clock generator comprises an asynchronous charge distribution clock generator.

9. The secure system of claim 5, wherein the charge distribution controller comprises a delay circuit.

10. A secure system, comprising:
    a plurality of circuit blocks on an integrated circuit (IC) chip;
    a plurality of charge storage devices on the IC chip, a first charge storage device of the plurality of charge storage devices being controllably connected and disconnected to a high supply rail of a corresponding circuit block of the plurality of circuit blocks and controllably connected and disconnected to a low supply rail of the corresponding circuit block; and
    a charge distribution controller, wherein the charge distribution controller supplies a first signal to connect and disconnect the first charge storage device from a power connection of a power supply, a second signal to connect and disconnect the first charge storage device from a ground connection of the power supply, a third signal to connect and disconnect the first charge storage device from the high supply rail of the corresponding circuit block, and a fourth signal to connect and disconnect the first charge storage device from a low supply rail of the corresponding circuit block.

11. The secure system of claim 10, wherein the charge distribution controller further supplies a fifth signal for discharging the first charge storage device.

12. The secure system of claim 10, wherein the charge distribution controller further supplies a sixth signal to connect and disconnect a second charge storage device of the plurality of charge storage device from the power connection of the power supply, a seventh signal to connect and disconnect the second charge storage device from the ground connection of the power supply, an eighth signal to connect and disconnect the second charge storage device from a high supply rail of the second charge storage device's corresponding circuit block of the plurality of circuit blocks, and a ninth signal to connect and disconnect the second charge storage device from a lower supply rail of the second charge storage device's corresponding circuit block.

* * * * *